(12) United States Patent
Lyman et al.

(10) Patent No.: US 10,628,900 B2
(45) Date of Patent: *Apr. 21, 2020

(54) SYSTEMS AND METHODS FOR PROMOTIONAL VALIDATION OF TRAVEL EXPENSES

(71) Applicants: Ian Lyman, Beaverton, OR (US); Tov Arneson, Beaverton, OR (US); Alexander Wilhelm, Beaverton, OR (US)

(72) Inventors: Ian Lyman, Beaverton, OR (US); Tov Arneson, Beaverton, OR (US); Alexander Wilhelm, Beaverton, OR (US)

(73) Assignee: Reach Now N.A., LLC, Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/214,883

(22) Filed: Dec. 10, 2018

(65) Prior Publication Data
US 2019/0251642 A1 Aug. 15, 2019

Related U.S. Application Data

(63) Continuation of application No. 15/882,927, filed on Jan. 29, 2018, now Pat. No. 10,152,759, which is a (Continued)

(51) Int. Cl.
*G06Q 50/14* (2012.01)
*G06Q 30/02* (2012.01)

(52) U.S. Cl.
CPC ........ *G06Q 50/14* (2013.01); *G06Q 30/0215* (2013.01)

(58) Field of Classification Search
CPC .................................................. G06Q 50/14
(Continued)

(56) References Cited

U.S. PATENT DOCUMENTS

| 6,085,124 | A  | * | 7/2000 | Choi     | G07B 15/02 |
|-----------|----|---|--------|----------|------------|
|           |    |   |        |          | 700/217    |
| 2002/0077953 | A1 | * | 6/2002 | Dutta    | G06Q 10/02 |
|           |    |   |        |          | 705/37     |
| 2008/0051951 | A1 | * | 2/2008 | Camacho  | E04H 6/422 |
|           |    |   |        |          | 701/23     |
| 2012/0130777 | A1 | * | 5/2012 | Kaufman  | G07B 15/02 |
|           |    |   |        |          | 705/13     |

(Continued)

*Primary Examiner* — Allyson N Trail

(57) ABSTRACT

A method for verification of travel and a purchase to prevent fraudulent redemption of a promotional offer for conditional transportation cost validation includes: using a customer's mobile computing device to transmit geolocation data to a validation network provider while present at the merchant's physical location; updating a token on the validation network provider's server using the geolocation data from the customer's mobile device, thereby confirming the customer's presence at the merchant's physical location; confirming the purchase by correlating transaction data from a linked payment method with the geolocation data from the customer's mobile device to update the token on the validation network provider's server; and automatically issuing a credit to the customer when the data points of the token fulfill the conditions of the promotional offer; wherein the promotional offer is to reimburse the customer for travel expenses the customer incurs for traveling to or from the merchant's physical location.

16 Claims, 23 Drawing Sheets

Related U.S. Application Data continuation-in-part of application No. 15/616,573, filed on Jun. 7, 2017, now Pat. No. 9,881,346, which is a continuation of application No. 14/831,803, filed on Aug. 20, 2015, now Pat. No. 9,727,932, which is a continuation-in-part of application No. 14/054,517, filed on Oct. 15, 2013, now Pat. No. 9,135,580.

(60) Provisional application No. 62/039,897, filed on Aug. 20, 2014, provisional application No. 61/713,921, filed on Oct. 15, 2012.

(58) Field of Classification Search
USPC ........................................ 235/378; 705/5, 13
See application file for complete search history.

(56) References Cited

U.S. PATENT DOCUMENTS

| | | | |
|---|---|---|---|
| 2012/0310712 A1* | 12/2012 | Baughman | G07B 15/02 705/13 |
| 2013/0143536 A1* | 6/2013 | Ratti | G08G 1/144 455/414.1 |
| 2013/0214041 A1* | 8/2013 | Wright | G07B 15/02 235/378 |
| 2013/0346121 A1* | 12/2013 | Shealy | G06Q 10/02 705/5 |
| 2014/0257943 A1* | 9/2014 | Nerayoff | G06T 7/292 705/13 |

* cited by examiner

SYSTEMS AND METHODS FOR PROMOTIONAL VALIDATION OF TRAVEL EXPENSES

CROSS-REFERENCE TO RELATED APPLICATIONS

This application is a continuation of application Ser. No. 15/882,927 filed Jan. 29, 2018, published as U.S. Patent Application Publication No. 2018/0150922, which is a continuation-in-part of application Ser. No. 15/616,573 filed Jun. 7, 2017, published as U.S. Patent Application Publication No. 2017/0270623 and issued as U.S. Pat. No. 9,881,346, which is a continuation of application Ser. No. 14/831,803 filed Aug. 20, 2015, now issued as U.S. Pat. No. 9,727,932, which claims priority from provisional application Ser. No. 62/039,897 filed Aug. 20, 2014 and is a continuation-in-part of application Ser. No. 14/054,517 filed Oct. 15, 2013, now issued as U.S. Pat. No. 9,135,580, which claims priority from provisional application Ser. No. 61/713,921 filed Oct. 15, 2012, all of which are incorporated by reference in this application.

SUMMARY

Disclosed is a system to validate promotional offers in the nature of a reduction or rebate of certain travel expenses through a network of local merchants who offer to offset travel costs in exchange for patronage. The system allows verification of the travel and the purchases.

BACKGROUND

Applicant is not aware of any system capable of validating promotional offers in the nature of a reduction or a rebate of travel expenses through a network of local merchants who offer to offset travel costs in exchange for patronage.

Shopping online has become a popular alternative to shopping locally at offline or "brick and mortar" businesses. Indeed, the popularity of online shopping has had a deleterious effect on the continued viability of many brick-and-mortar businesses, driving smaller mom-and-pop operations to shut down. The commercial centers and urban cores that house these businesses have felt a corresponding drop in commercial activity and loss of tax revenue. A primary driver in the growth of online shopping has been the introduction of conditional free shipping by online retailers. Conditional free shipping lowers costs (shipping and carriage fees) to customers while serving to increase the average spend per transaction by tapping consumer psychology.

Parking validation has long been utilized by both parking operators and other businesses to help consumers offset the cost of parking associated with visiting a particular business district or establishment. Parking validation is typically a co-operative effort between restaurants, retailers and other businesses (validators) and parking facilities, wherein validators subsidize (in part or whole) the parking fees of visitors as who patronize their business. Parking facilities typically charge participating validators incrementally per validation, or charge validators a predetermined amount for a line-of-credit (monthly, yearly). Validators participate in parking validation programs as a measurable way to increase sales at a relatively nominal cost and to foster long-term customer loyalty. Some parking validation programs are typically operated via a paper ticket with a stamp and/or written marking to denote validation. Some parking validation programs utilize an electronically printed paper receipt printed with a bar code that can be used to track validation. Parking validation programs limit consumers to validating with only a single validator. Parking validation programs are typically operated on a garage by garage basis. A single garage will accept validation by a select group of validators and a given validator will only validate parking at a single garage.

OBJECTS AND FEATURES

A primary object and feature of the present invention is to promote free or reduced-fee travel expenses to encourage consumers to "ship themselves free" to participating merchants using participating travel providers.

It is a further object and feature of the present invention to promote groups of local merchants by encouraging shopping with local merchants during travel sessions with relevant, targeted promotional offers.

It is a further object and feature of the present invention to promote discounted travel to consumers.

It is yet another object and feature of the present invention to provide verification of the travel and verification of the purchases to prevent fraudulent redemption.

Another primary object and feature of the present invention is to provide such a system that is safe, efficient, trustworthy, inexpensive and handy. Other objects and features of the present invention will become apparent with reference to the following descriptions.

DETAILED DESCRIPTION

Figure 1:
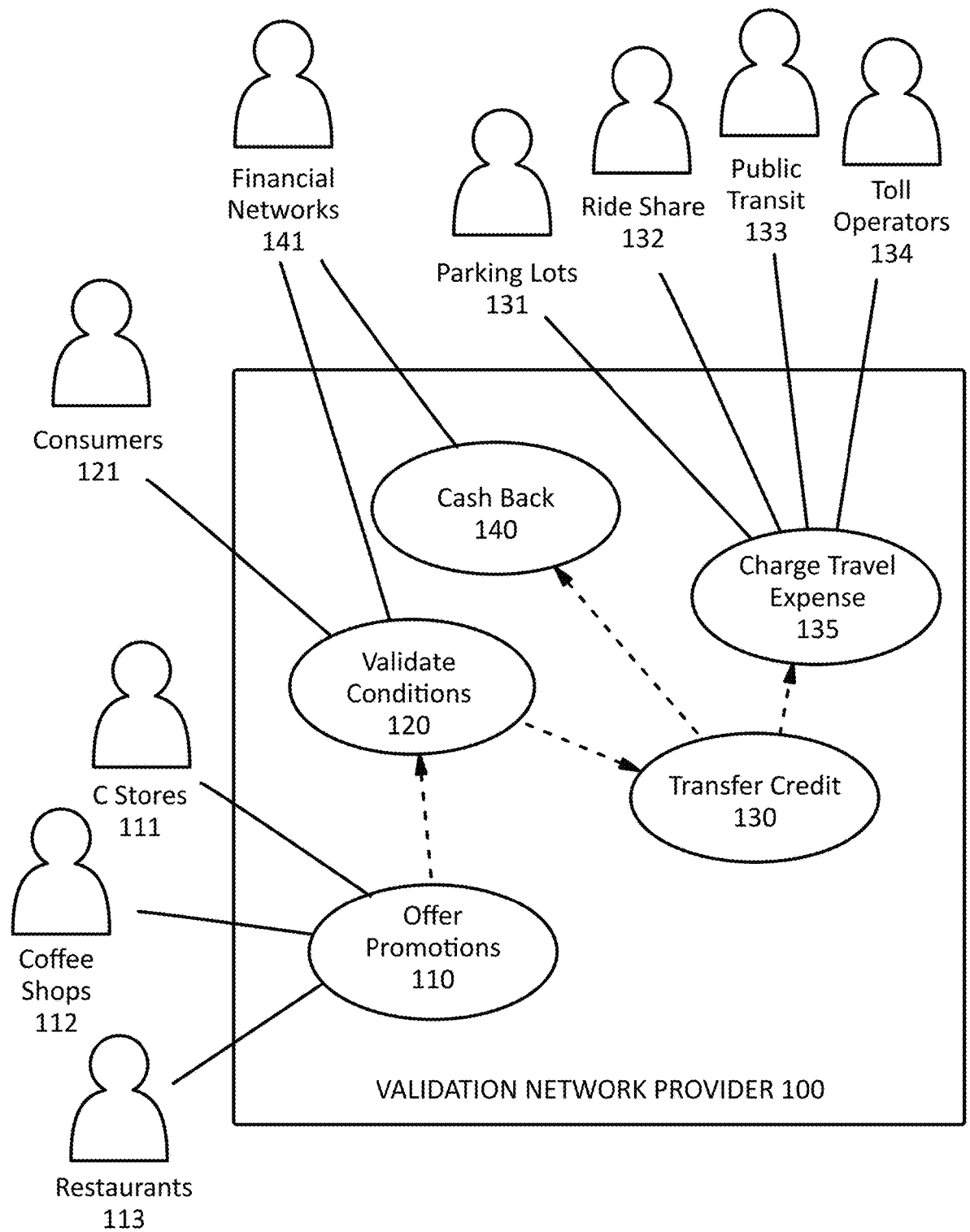
FIG. 1 shows a use case diagram view that illustrates the major functions of the system and method for the consumer-travelers, the merchant-validators, travel-providers and financial networks 141.

FIG. 1 shows a use case diagram view that illustrates the major functions of the system and method for the consumer-travelers 121, the merchant-validators 111-113, travel-providers 131-134 and financial networks 141. Merchant-validators 111-113 can connect to and offer promotional validation (or conditional subsidies or discounts on travel expenses) to consumers 121. This system and method extends the benefits of conditional free shipping offline by allowing consumers 121 to validate a variety of transportation costs 135 (the cost of moving the consumer to the goods) when they patronize participating businesses.

The system 100 extends the benefits of conditional free shipping offline by allowing consumers to validate a variety of transportation costs (the cost of shipping themselves) when they patronize participating businesses. Transportation costs are myriad and can include parking, fuel, taxis, ride shares, mileage, public transport, airfare, train tickets or simply time spent traveling. The advent of mobile technology and related software applications has made it possible to identify and connect in real-time with consumers and provide customized validation options from a wide array of unaffiliated transportation and parking providers and validators simultaneously. The disclosed invention utilizes mobile & cloud based technology to enable validators to tender Validation Offers electronically to potential or existing customers via a plurality of dedicated web and mobile applications on demand or based on one or more factors, including time, location, or interaction with wireless devices or beacons. These Validation Offers can include discounts, reimbursements, cash, cryptocurrency or other incentives available only to customers who meet a pre-determined spending threshold or other condition, confirmed when they interact electronically with a proprietary encoded Validation Token. Validation Offers can be tendered to individual consumers through their personal mobile device (smartphone, tablet, wearable, etc.) from a network of validators and transportation and parking providers, allowing consumers to forgo the need to choose a specific provider to obtain access to a particular Validation Offer.

Conditional transportation cost validation enables offline businesses to tap the same psychology that online businesses have exploited to increase the average spending per transaction and to increase customer lifetime value (loyalty). By setting spending thresholds required to earn validation to slightly higher than the historic average spending level, businesses can stimulate increased spending. By setting the validation discount, reimbursement or other reward to an appropriate value, the business can incrementally increase their per transaction profit.

Merchant-validators 111-113 can tender Validation Offers 110 electronically to potential or existing customers via a plurality of dedicated web and mobile applications on demand or based on one or more factors, including time, location, or interaction with wireless devices or beacons. These Validation Offers 110 can include discounts, reimbursements, cash, cryptocurrency or other incentives available only to customers who meet a pre-determined spending threshold or other condition. Mobile technology and related software applications allow the validation network provider 100 to identify and connect in real-time with consumers 121 and provide customized validation options 110 from a wide array of unaffiliated transportation and parking providers 131-134 and merchant-validators 111-113 simultaneously.

Consumers 121 can begin a travel session, or, a travel session can be detected by the system. The Validation Network Provider 100 can present Validation offers 110 to the consumer 121 based on a variety of conditions, including, proximity, past purchase history, time of day, day of week, and other factors typically used in customer loyalty programs. Consumers 121 can validate several offers, thereby increasing the amount of the discount, simply by fulfilling and activating multiple offers. In some embodiments, the amount of the credit can exceed the travel expenses.

The Validate Conditions function 120 confirms that the consumers 121 have met the conditions and the merchant-validators 111-113 can present the consumer 121 with a encoded Validation Token. Validation Offers can be tendered to individual consumers through their personal mobile device (smartphone, tablet, wearable, etc.) from a network of validators 111-113 and transportation and parking providers 131-134, allowing consumers to forgo the need to choose a specific provider to obtain access to a particular Validation Offer.

Additionally, the validate conditions function 120 allows the consumer access to a validation token, for example, by scanning a QR (quick response) code, accessing a machine-identifiable marker, connecting to or coming in range of a near field communications device, or arriving at a particular geo-location.

Conditional transportation cost validation enables offline businesses to tap the same psychology that online businesses have exploited to increase the average spending per transaction and to increase customer lifetime value (loyalty). By setting spending thresholds required to earn validation to slightly higher than the historic average spending level, businesses can stimulate increased spending. By setting the validation discount, reimbursement or other reward to an appropriate value, the business can incrementally increase their per transaction profit.

The travel-providers 131-134 charge travel expenses. The accumulated credit from validation offers can offset the travel expense. There are several methods to credit the consumer. The travel-provider 131-134 can integrate with the validation network provider 100 and display the credit after querying the network. The travel-provider 131-134 can receive payment from the validation network provider 100. Alternately, the validation network provider 100 can present cash back to the consumer by an electronic financial transaction with the financial networks 141, as shown.

The order of transactions can vary. For example, some types of travel, such as public transportation, require advance payment. Other types of travel do not require payment until later, such as parking lots. The system accommodates the various customary timing of payments for all travel expense types.

The system 100 must take into account different potential scenarios where the customer extracts value from the validation credits depending on the type of transportation session. In all scenarios, the starting point is when the customer has arrived at their destination, activated their session and visited their first merchant. It is determined that the merchant does offer validation on the platform. The next determination is whether the merchant offers validation that is tied to a spend threshold or offers it as a courtesy despite the amount of money spent by the customer.

If the merchant offers validation on the platform that is tied to a spend threshold, the merchant has determined one or more combinations of a dollar amount of minimum spend to qualify for a specific dollar amount of validation credit. In order to qualify for validation, the customer must meet or exceed one of these tiers of the spend/validation levels. If the customer does not qualify, they do not receive a validation credit, and the merchant is not charged. If the customer does qualify, they are granted the validation credit. The merchant then is charged for the validation credit and a fee to the platform provider for successfully converting a customer into a sale that exceeds the spend threshold. This fee, the "merchant fee," is calculated as a % of the spend threshold that the customer qualified for. By way of example, a scenario where a merchant offers $7 in validation credit if a customer meets or exceeds a pre-tax spend of $100, and the platform provider fee is 2.5% of the spend threshold. If a customer converts into a sale that totals $100 pre-tax and is granted validation, the total charge for the merchant is $9.50. This total charge is broken up into 2 components. $7 of this charge is from the stated validation credit that the merchant has determined. $2.50 of this charge is the merchant fee due to the platform provider, calculated as 2.5%×$100. If a customer converts into a sale that totals $125 pre-tax and is granted validation, the total charge for the merchant is $9.50, with the components of the charge being identical. If a customer converts into a sale that totals $99 pre-tax, they have not qualified for validation, and the total charge for the merchant is $0.

If a merchant offers validation on the platform that is provided as a courtesy to customers, regardless of spend or amount of spend, and possibly in which validation is provided at the sole discretion of the clerk, than the merchant will decide a dollar amount of validation to provide each time it is granted. The total cost to the merchant each time a validation is granted can be equal to the dollar amount of validation credit provided plus a dollar amount of merchant fee due to the platform provider. By way of example, if a merchant participates in the platform by offering $5 of validation credit to a customer regardless of spend and has agreed to pay a $1 fee to the validation network provider each time a validation is granted, the total charge to the merchant is $6 each time.

Figure 2:
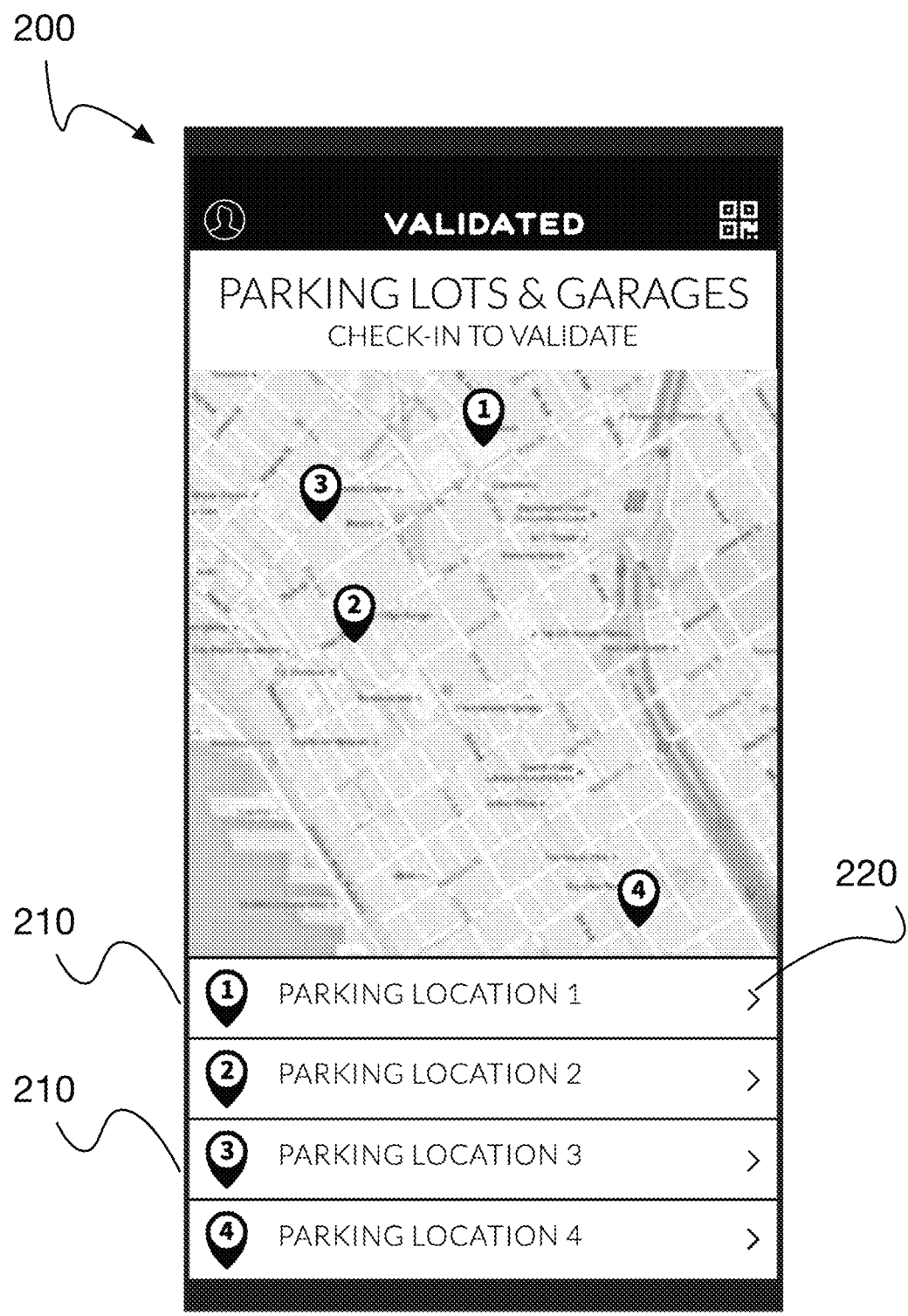
FIG. 2 shows a computer screenshot view that illustrates the event of a consumer check-in to a travel provider, for example, a parking garage or parking lot.
Figure 3:
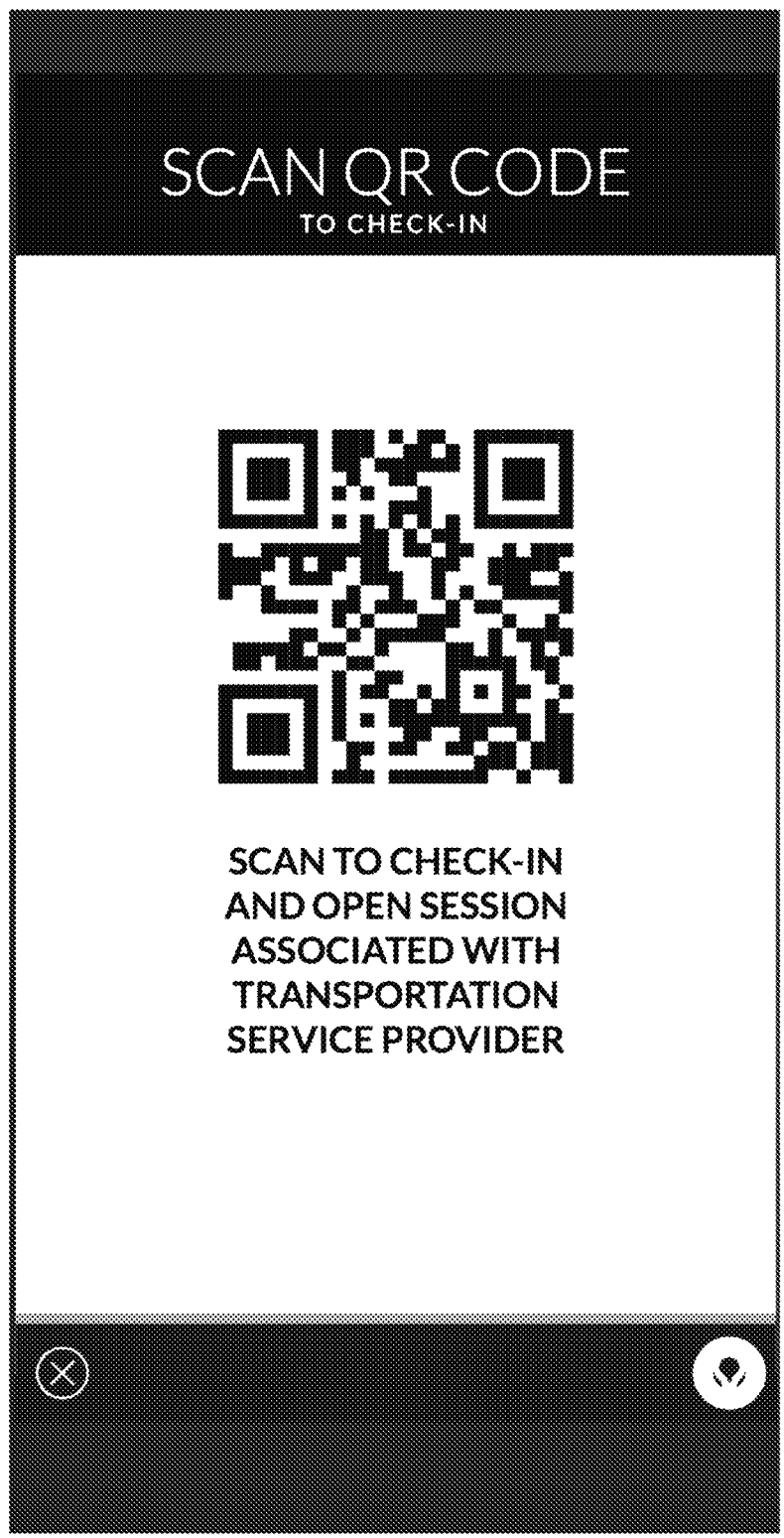
FIG. 3 shows a computer screenshot view that illustrates the event of qr-scan check-in to a travel provider.
Figure 4:
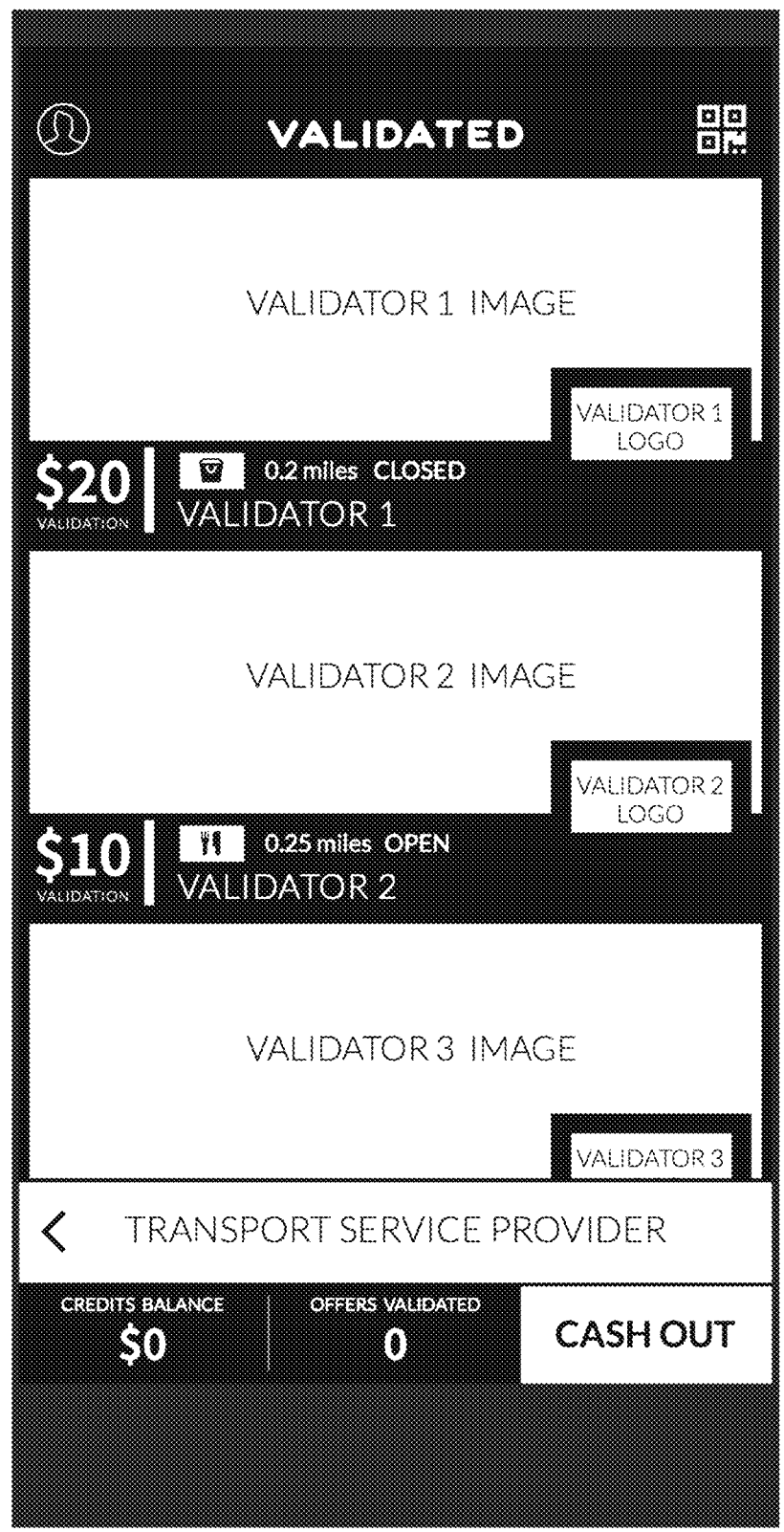
FIG. 4 shows a computer screenshot view that illustrates a list of promotional validations offers by merchants near the check-in event.
Figure 5:
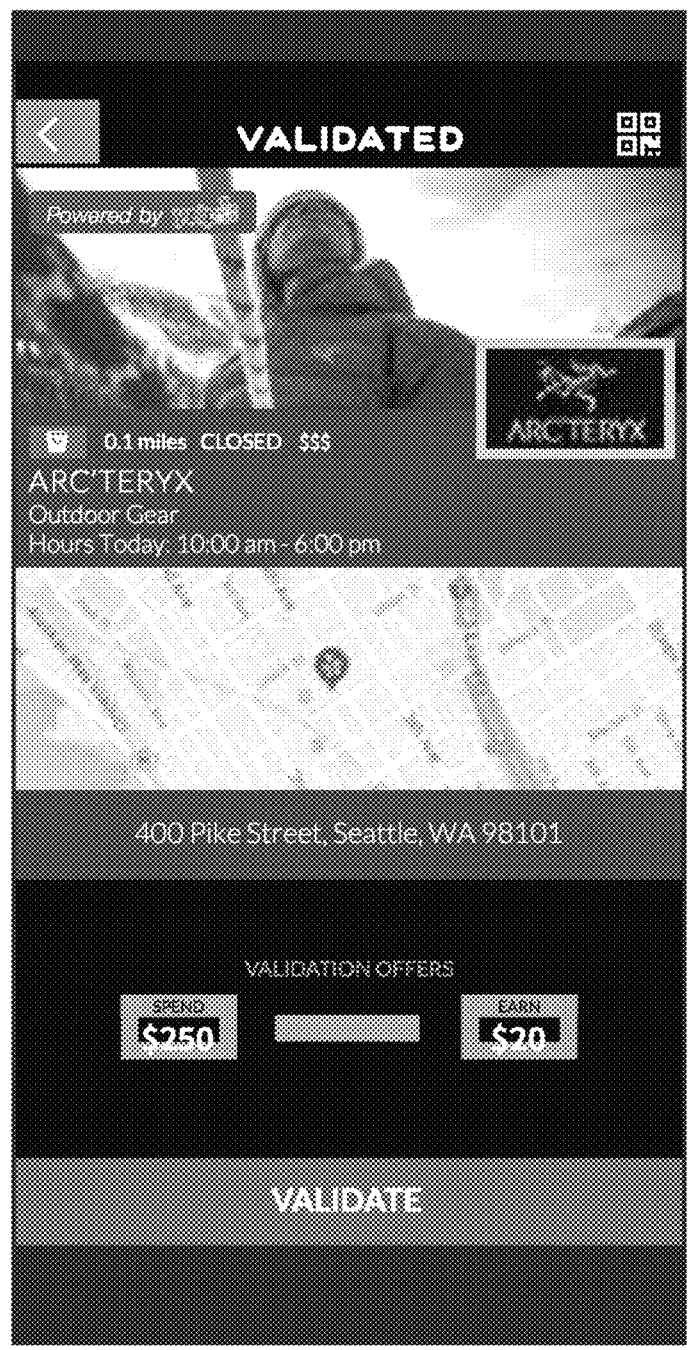
FIG. 5 shows a computer screenshot view that illustrates the step immediately prior to entering validation of a particular promotional offer by a merchant.
Figure 6:
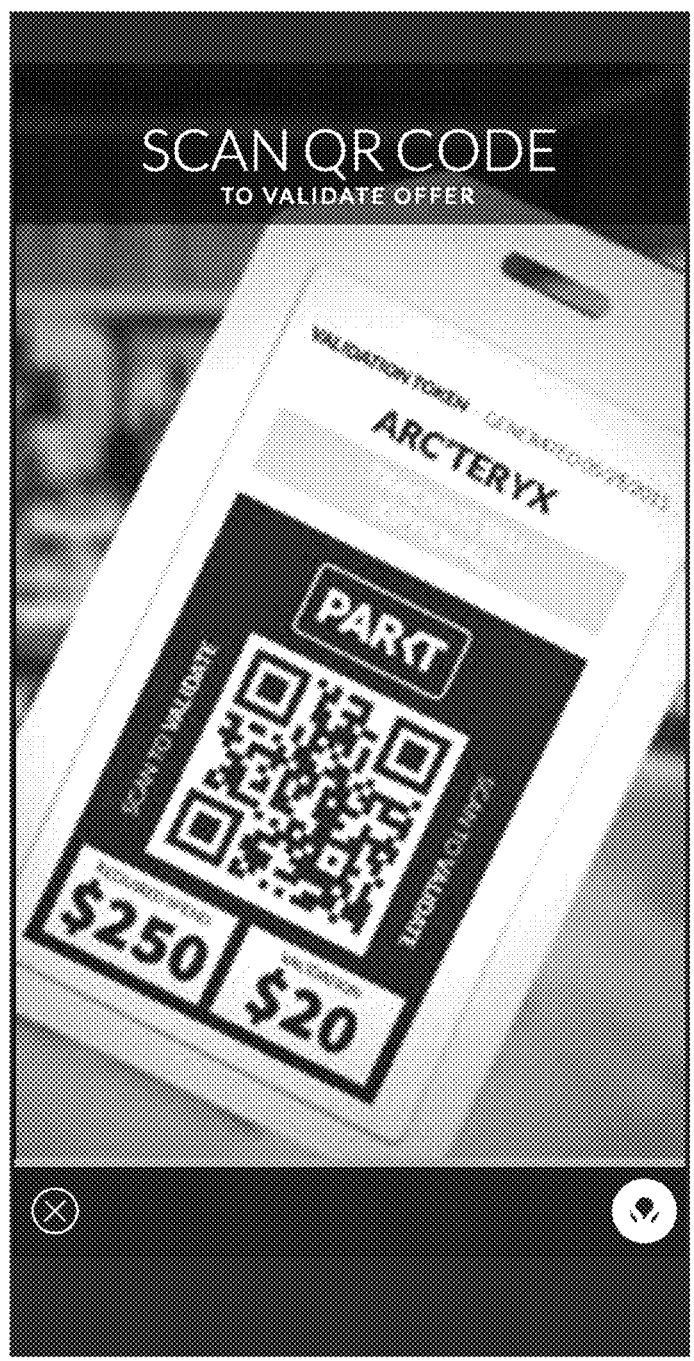
FIG. 6 shows a computer screenshot view that illustrates the event of qr-scan or optical scan of a validation token at the merchant after purchase.
Figure 7:
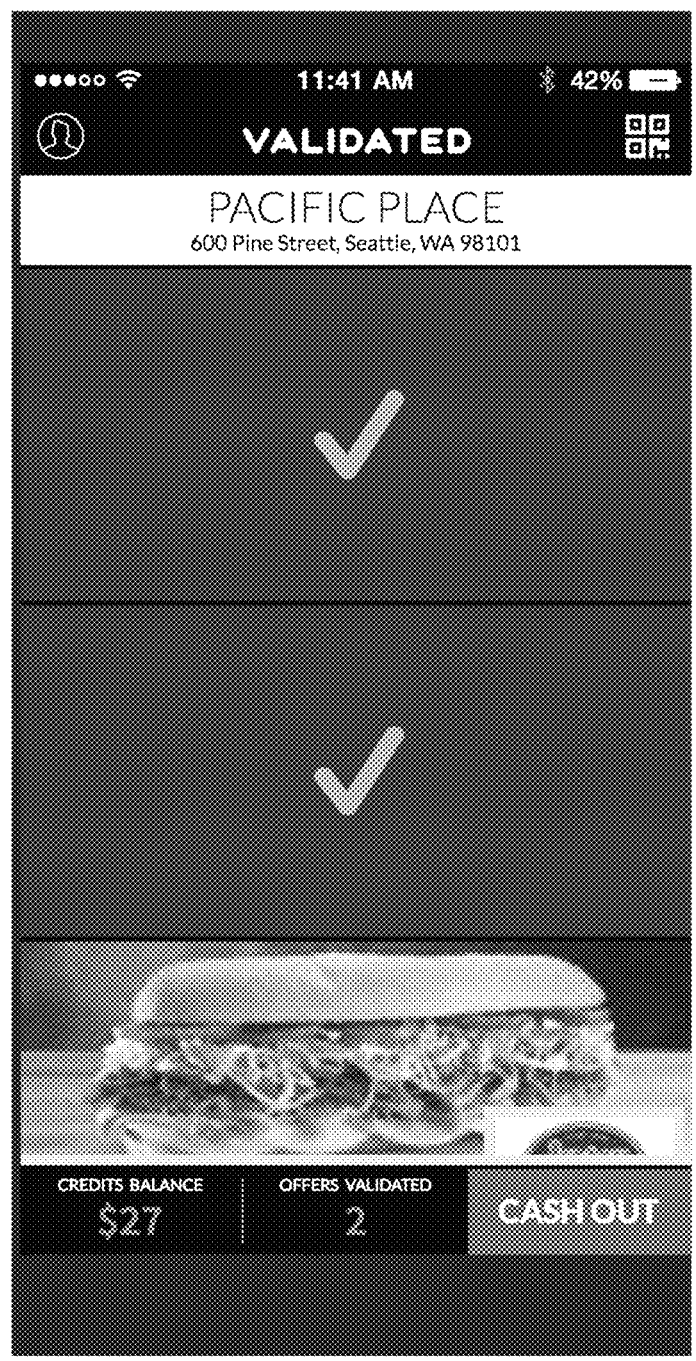
FIG. 7 shows a computer screenshot view that illustrates a list of completed promotional validation offers, including the credit provided by the merchants.
Figure 8:
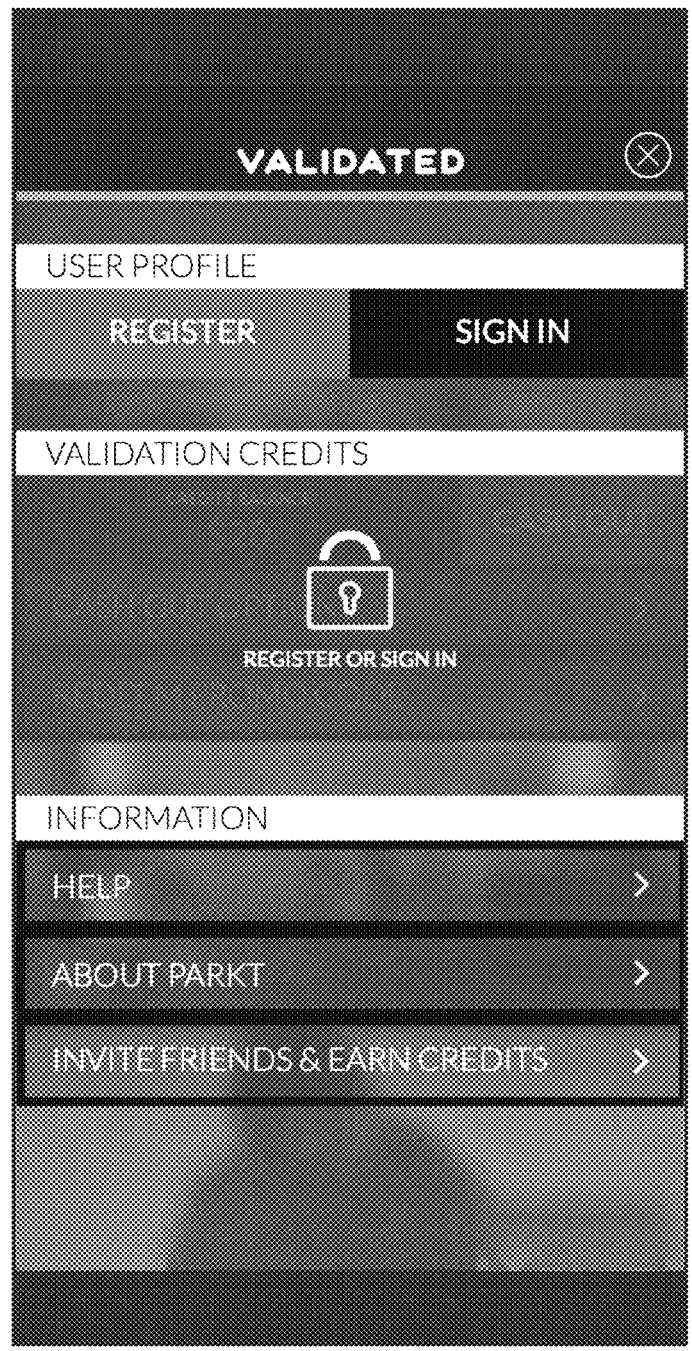
FIG. 8 shows a computer screenshot view that illustrates a signup form to allow claim of the credit.
Figure 9:
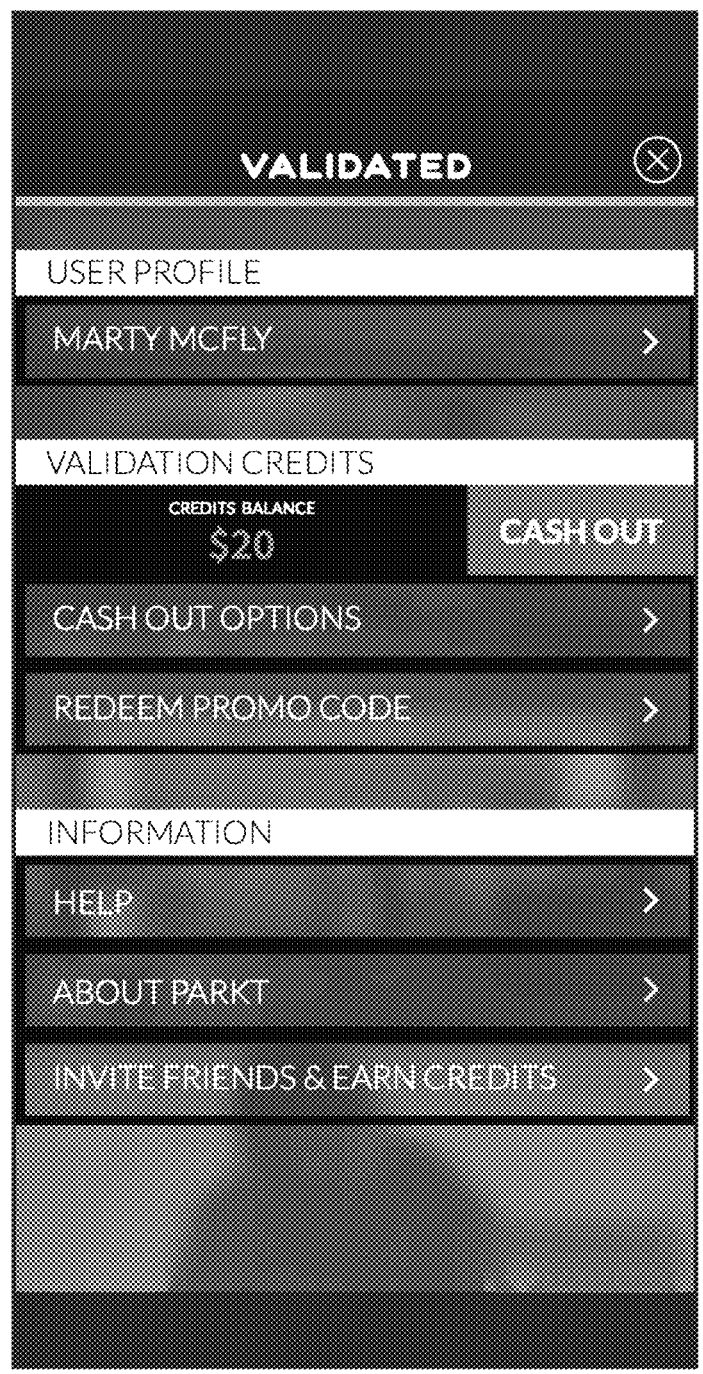
FIG. 9 shows a computer screenshot view that illustrates a selection form to initiate a credit transaction.
Figure 10:
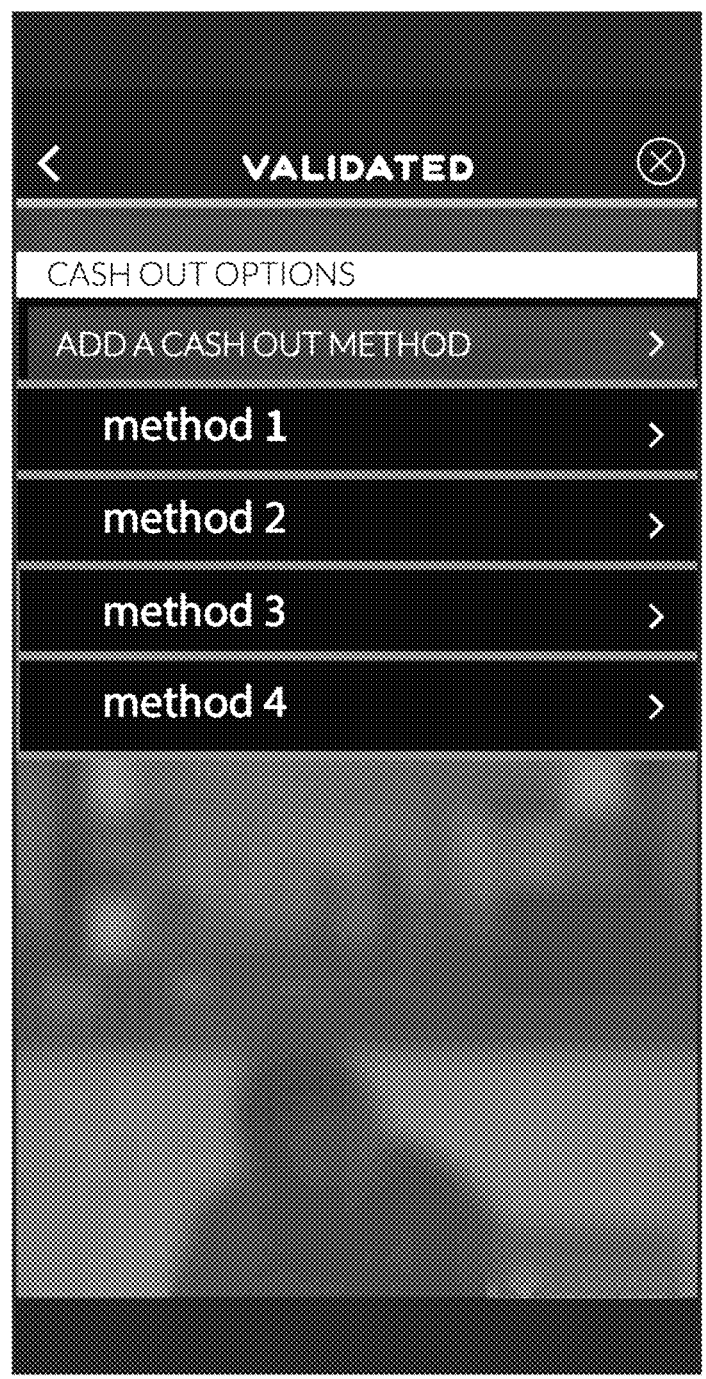
FIG. 10 shows a computer screenshot view that illustrates a selection form to select among various credit cards, bank accounts or other payment networks.
Figure 11:
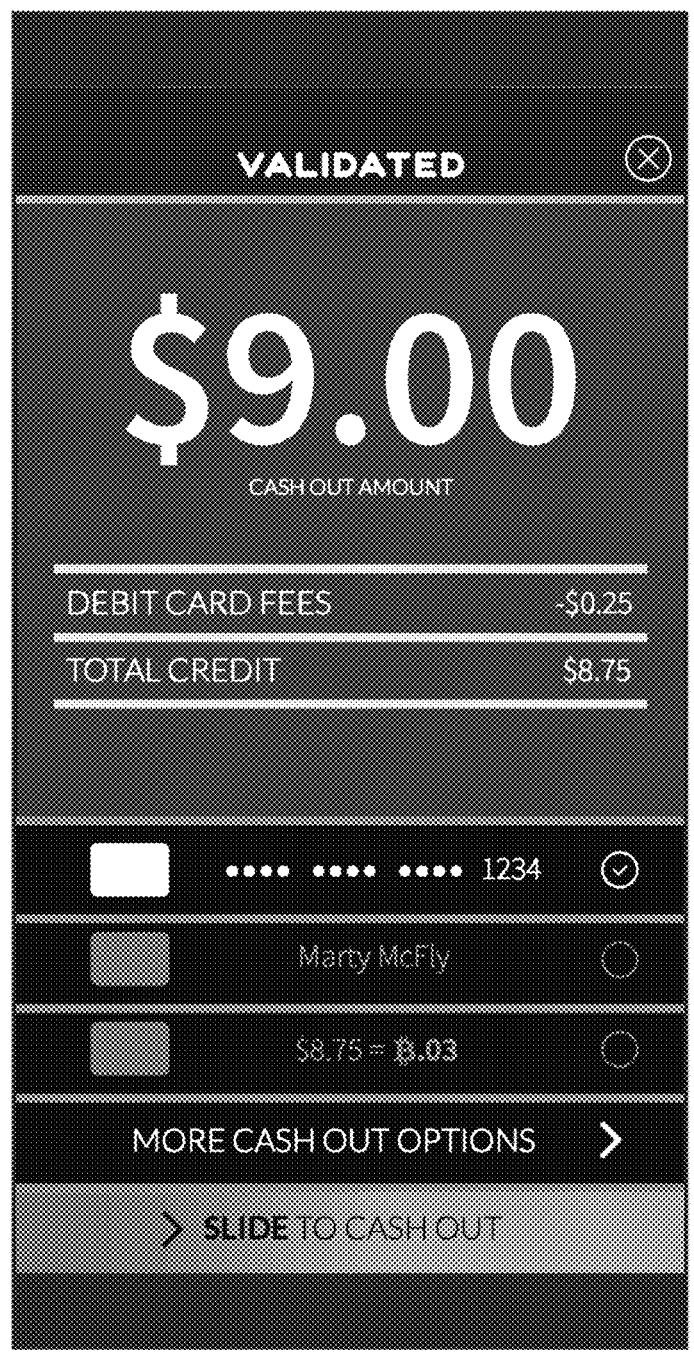
FIG. 11 shows a computer screenshot view that illustrates a detail form to verify the details of the financial transaction for credit immediately prior to processing.
Figure 12:
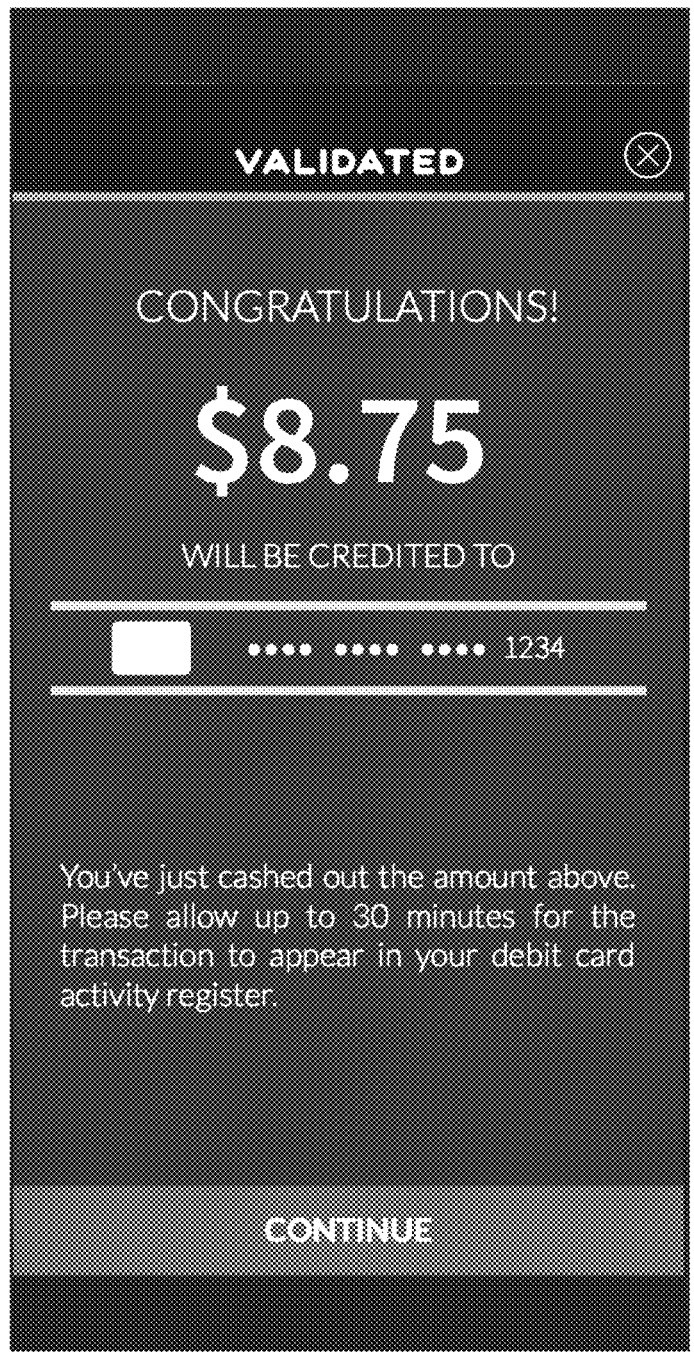
FIG. 12 shows a computer screenshot view that illustrates a receipt form to show the financial transaction processing is complete.

FIG. 2 shows a computer screenshot view that illustrates the event of a consumer check-in to a travel provider, for example, a parking garage or parking lot. The system 200 shows a screen of a web or mobile computer program application running on a mobile device. System 200 shows the user-interface for providing mobile-based validation of promotional offers. The system 200 comprises allowing parkers to choose specific parking validation offers 210 or parking discounts from nearby validators. The system 200 can present the validation offers to the application user or parker, enabling validators to send their specific offers directly to individual parkers. Additionally, the system 200 can present the discounts activated by parkers to a parking facility for redemption by cashiers, automated revenue control systems or parking meters.

The system 200 includes a means to generate an electronic "ticket" for the consumer that references a parking session (or other travel expense) in a paid parking environment and display the consumer's ticket on a smartphone, tablet or other computing device. Interactive elements are included on the electronic ticket such as validation offers 210 from the validators, user controls 220 that allow details of the specific offer to be viewed, data to allow the sponsoring validator to verify the offer and the ticket, and display of the aggregated parking savings from the sum of all offers activated during the parking session (See FIGS. 4, 5, 7, 9, etc.). Additionally, the system 200 includes a means for parkers to activate an offer once it has been verified by the sponsoring merchant by interaction with a proprietary validation token provided to validators. The validation token can take several forms, examples of which are a 2D optical code, other machine identifiable markers, a near-field communications device. In certain embodiments the system might include a control to allow parkers to elect to receive credit, in the form of flat currency, crypto-currency, or gift card points in lieu of a discount to parking fees. Methods for viewing, activating and redeeming a mobile validation offers are disclosed herein.

Figure 13:
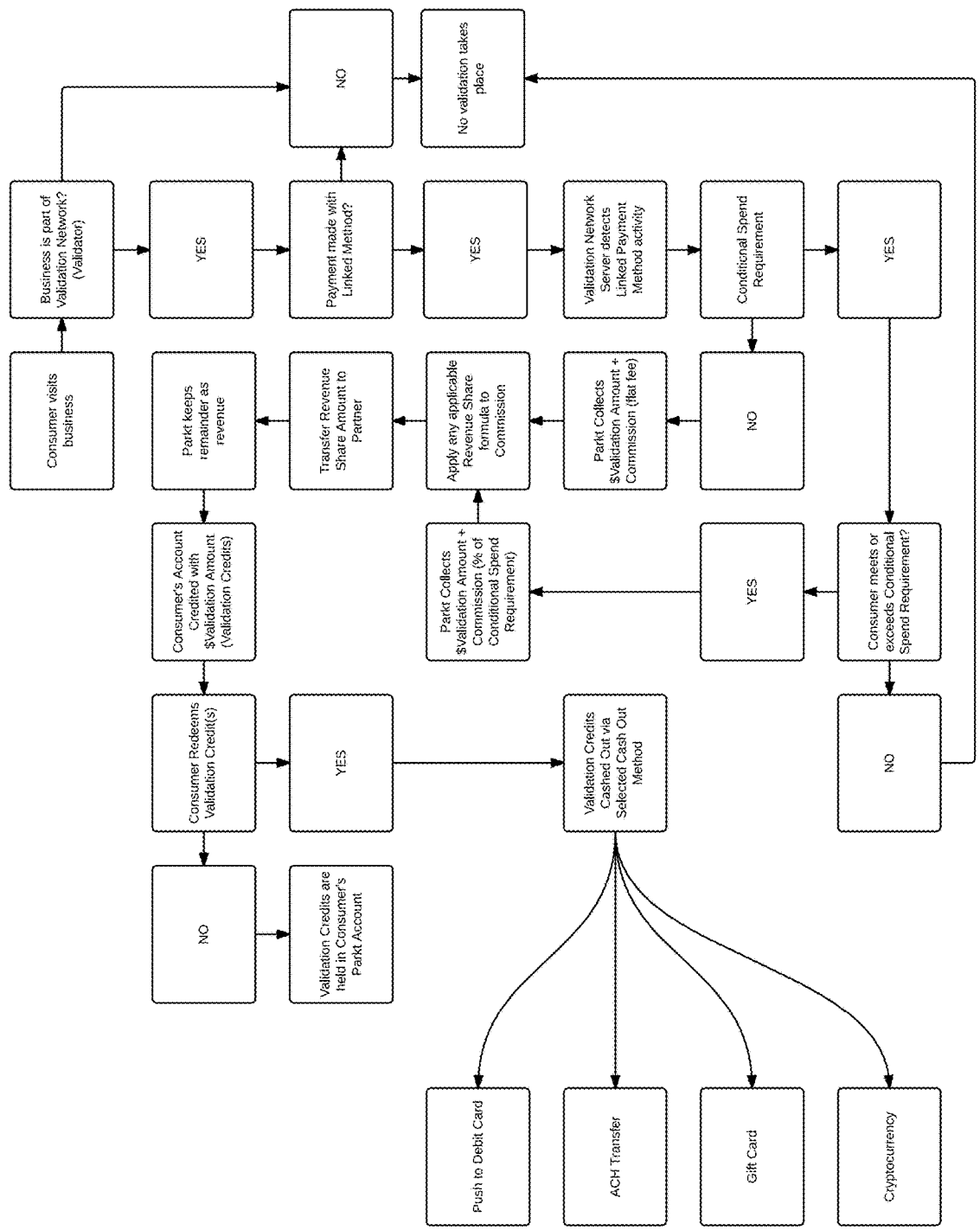
FIG. 13 shows a flowchart view that illustrates the process of verifying that the promotional offer conditions have been met by querying a payment network that has been linked to the validation network.

The first scenario, shown in FIG. 13, shows the steps for a validation offer from a merchant, where the merchant's equipment, merchant's revenue control systems, or merchant's fare collection systems do not integrate with the Validation Network Provider. The customer visits the merchant's physical location and is granted validation by either spend threshold qualification or as a courtesy, depending on the merchant's terms for the promotional validation offer. For each validated promotional offer, the customer will be credited a dollar amount paid by the merchant. The customer can be limited to one validation per day from an individual merchant, but can visit multiple merchants on a single day and "stack" validation credits from each of them. In this scenario, when the customer visit is ending, or has already ended, the customer can choose to send the validation credits directly into their bank account [through push to card process described earlier] to offset the parking or transportation costs that will be incurred as a result of the trip. The validation network provider is responsible for collecting the validation credit and the merchant fee from the merchant(s) that provided the credit, and delivering to the relevant platform user. Once validation dollars are delivered, the remaining money from the session is the full amount of the merchant fee. In some embodiments, the validation network provider may have an arrangement with the transportation operator used in the session where a portion of this merchant fee is shared with the operator as part of a mutually beneficial business partnership. If such a fee sharing agreement does not exist, the validation network provider books the entire merchant fee as revenue. If a fee sharing agreement does exist, the validation network provider delivers the portion of the merchant fee owed to the transportation operator, and books the remaining amount as revenue.

Figure 14:
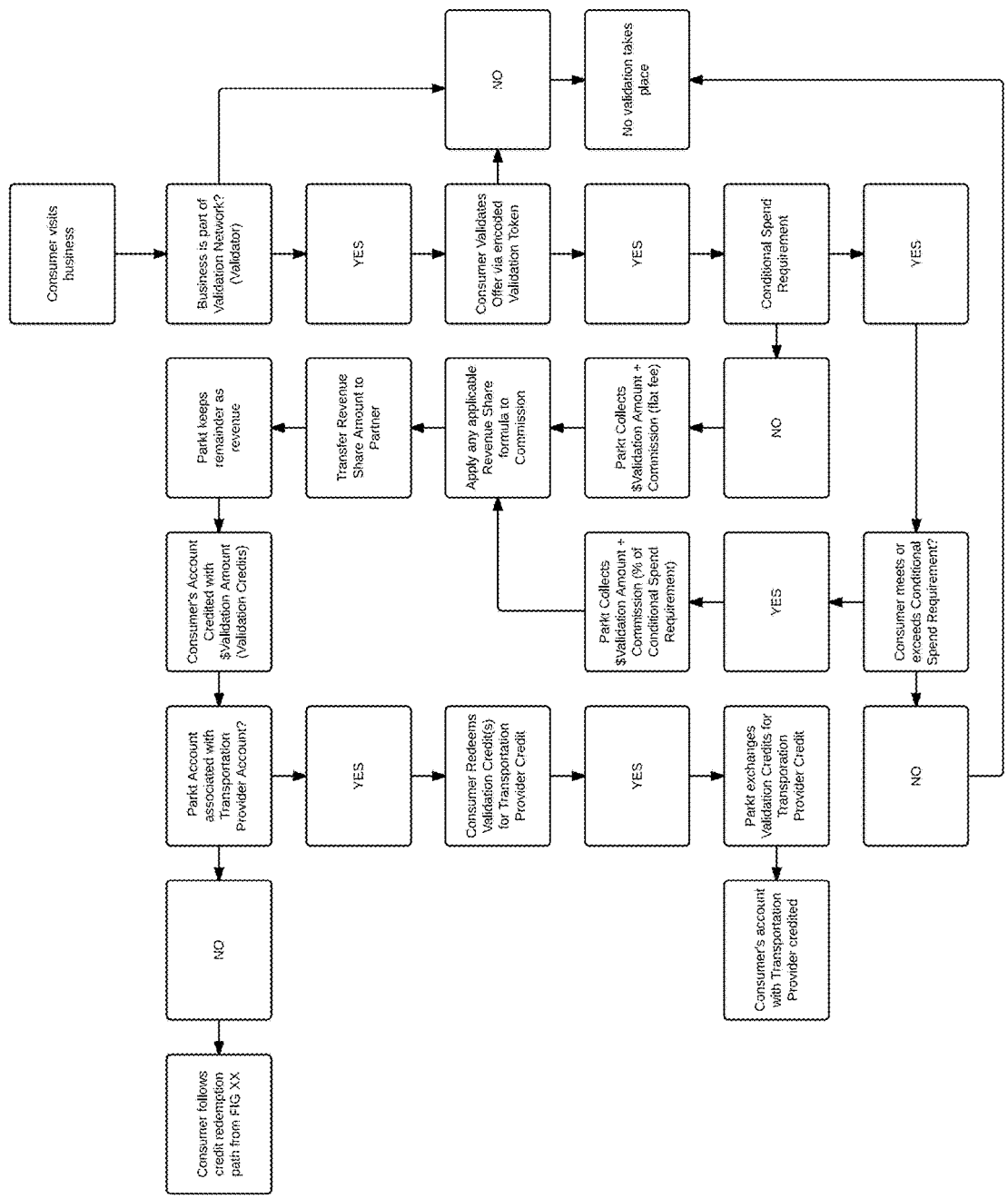
FIG. 14 shows a flowchart view that illustrates the process of verifying that the promotional offer conditions have been met via an encoded validation token available from the merchant.

The second scenario, shown in FIG. 14, is an integrated parking session where the validation credits from the platform provider interact with the parking operators equipment, revenue control and fare collection. The customer has visited the merchant and is granted validation by either spend threshold qualification or as a courtesy. In each instance, the customer will be credited a dollar amount of validation from the merchant. The customer is limited to one validation per day from an individual merchant, but can visit multiple merchants on a single day and "stack" validation credits from each of them. In this scenario, when the customer visit is ending, or has already ended, the customer will have the option to directly apply the validation credits to discount the parking fees that will be realized at the end of their parking session. Applying the validation credits in this scenario can result in a final parking cost to the customer that is reduced or a final cost to the customer that is completely free of charge. The platform provider is responsible for collecting the validation credit and the merchant fee from the merchant(s) that provided the credit. The platform provider will then send the dollar amount of validation credits applied to the session to the relevant parking operator. In some cases, but not all cases, the platform provider may have an arrangement with the parking operator used in the session where a portion of this merchant fee is shared with the operator as part of a mutually beneficial business partnership. If a fee sharing agreement does exist, the platform provider delivers the portion of the merchant fee owed to the parking operator along with the validation credit owed, and the remaining amount of the merchant fee is booked as revenue. If such a fee sharing agreement does not exist, the platform provider books the entire merchant fee as revenue. There may be a scenario where the total validation credits received are greater than the final direct cost of the parking session, or "over-validation", in which case the final parking cost realized to the parking customer is free of charge, and the customer is allowed to keep the excess validation credits for a future transportation session or to send directly into their bank account as cash. In this case, the platform provider will hold the cash collected from the merchant for the purposes of validation until the user chooses to extract value from the credit. If the user chooses to send the credit directly into their bank account as cash, the platform provider will send the held credit directly to the user. If the user chooses to apply the credit to a future transportation session's cost, the platform provider will send the held credit to the relevant transportation provider in the session.

Figure 15:
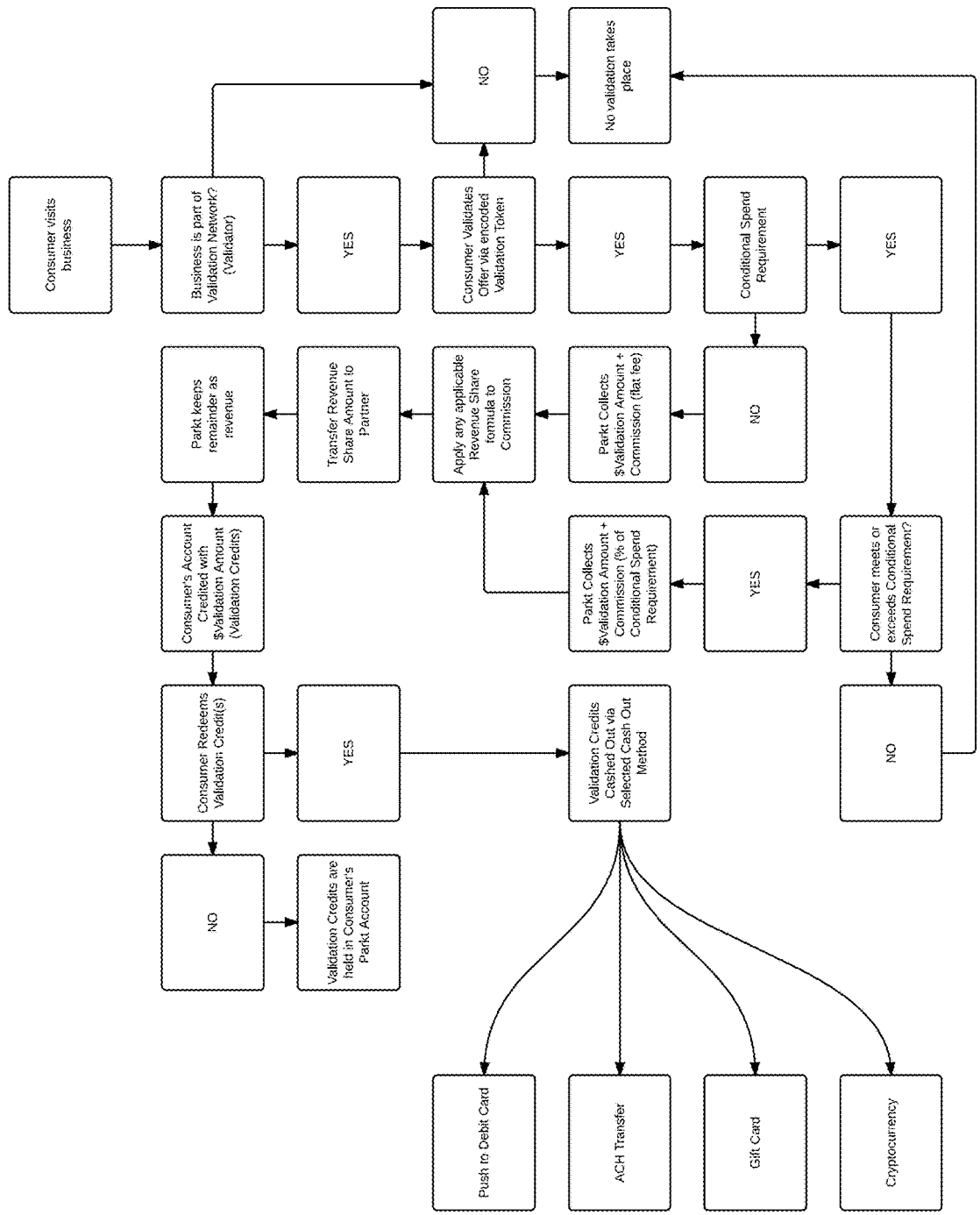
FIG. 15 shows a flowchart view that illustrates an embodiment where the consumer validates a promotional offer by en encoded validation token at the merchant, and then, later selects between any of the available financial transactions to obtain cash back in the amount of the offer.
Figure 16:
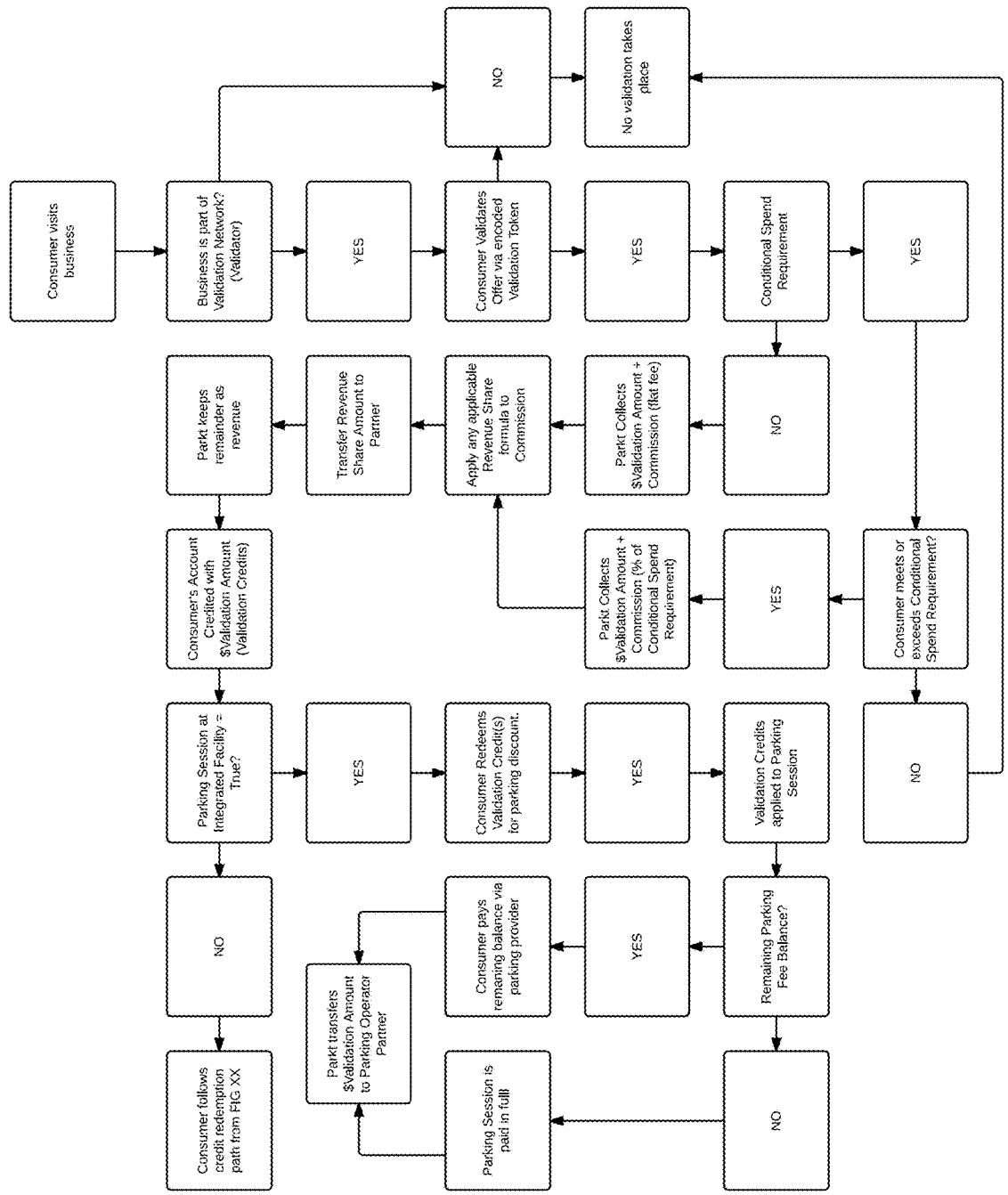
FIG. 16 shows a flowchart view that illustrates an embodiment where the consumer validates a promotional offer, and, the validation network provider later transfers the validation amount from the merchant to the travel provider.

The Third Scenario, showcased in FIG. 15, is a session where the transportation method chosen by the customer allows for individual user accounts that can store value by purchasing credit, and the platform provider is an integrated partner with the transportation provider that can act as a method of feeding the user accounts stored value. The customer has visited the merchant and is granted validation by either spend threshold qualification or as a courtesy. In each instance, the customer will be credited a dollar amount of validation from the merchant. The customer is limited to one validation per day from an individual merchant, but can visit multiple merchants on a single day and "stack" validation credits from each of them. In this scenario, when the customer visit is ending, or has already ended, the customer has or will link their account with the relevant transportation provider into the platform provider. The customer will choose to send the validation credits directly into their account with the transportation provider to offset the costs that have been incurred, or will be incurred on the return trip. The platform provider is responsible for collecting the validation credit and the merchant fee from the merchant(s) that provided the credit, and delivering to the relevant transportation provider, so that the transportation provider realizes collects the full amount of fare that is owed. In some cases, but not all cases, the platform provider may have an arrangement with the transportation operator used in the session where a portion of this merchant fee is shared with the operator as part of a mutually beneficial business partnership. If a fee sharing agreement does exist, the platform provider delivers the portion of the merchant fee owed to the transportation operator along with the validation credit owed, and the remaining amount of the merchant fee is booked as revenue. If such a fee sharing agreement does not exist, the platform provider books the entire merchant fee as revenue. There may be a scenario where the platform user makes the decision to store all or a portion of the validation credit from the session for future use, or send directly into their bank account as cash. In this case, the platform provider will hold the cash collected from the merchant for the purposes of validation until the user chooses to extract value from the credit. If the user chooses to send the credit directly into their bank account as cash, the platform provider will send the held credit directly to the user. If the user chooses to apply the credit to a future transportation session's cost, the platform provider will send the held credit to the relevant transportation provider in the future sessions.

Combined Verification Techniques

Figure 17:
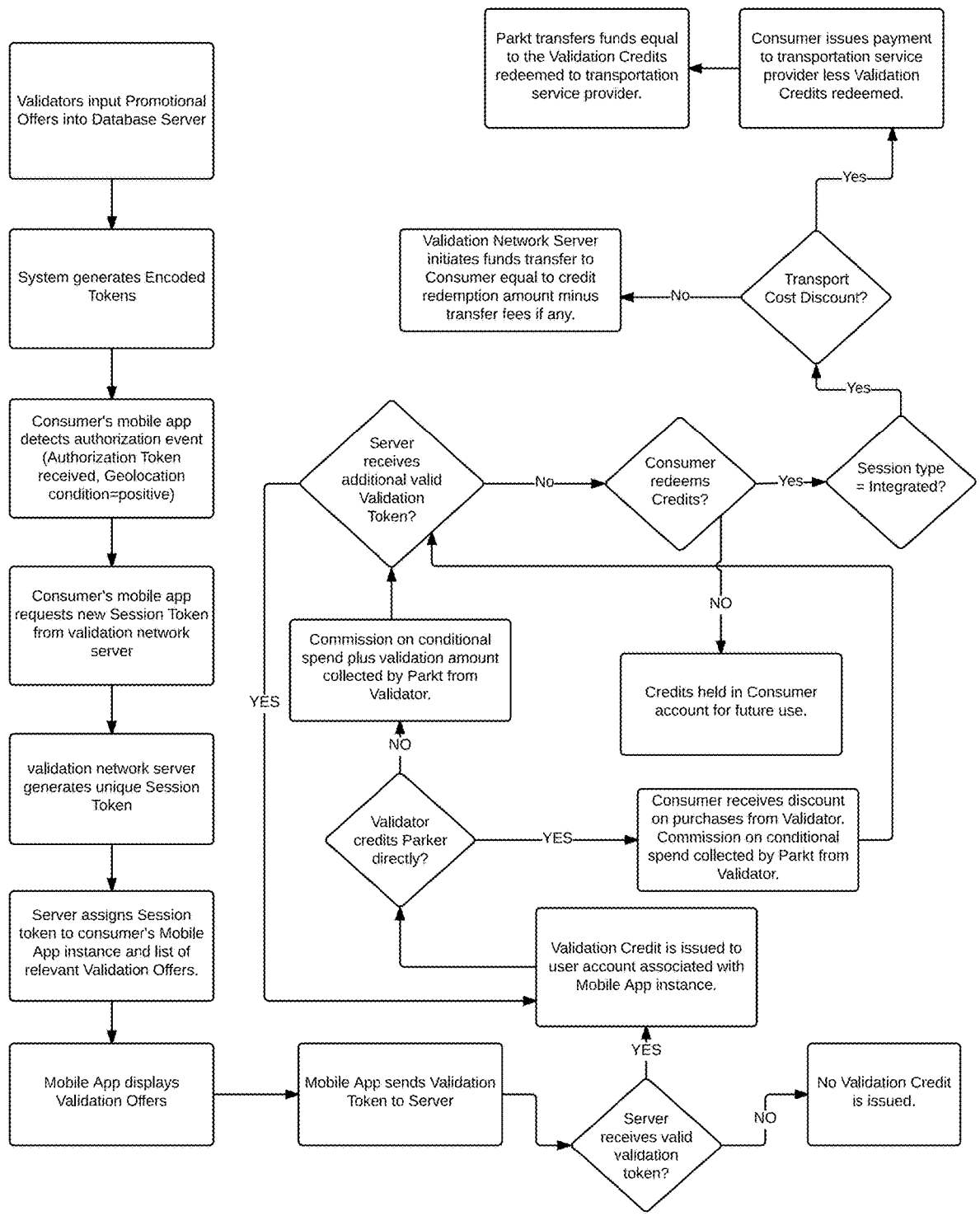
FIG. 17 shows a flowchart view that illustrates an overview of the method from receiving promotional offers from merchants, validation of the offers by consumers, and crediting to travel providers or financial networks.
Figure 18:
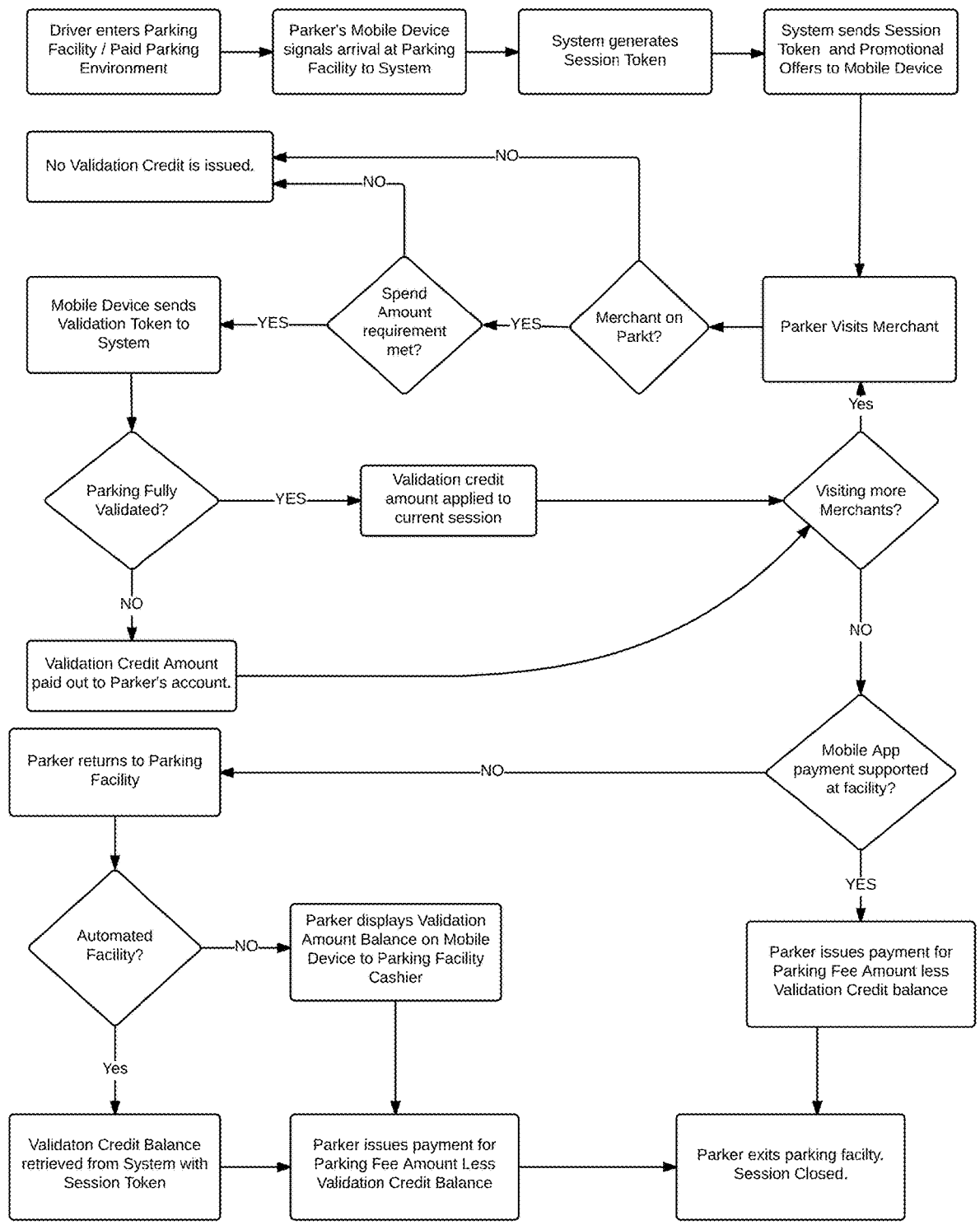
FIG. 18 shows a flowchart view that illustrates an embodiment of the present invention where the travel provider is a parking facility and the consumer is driving a car.
Figure 19:
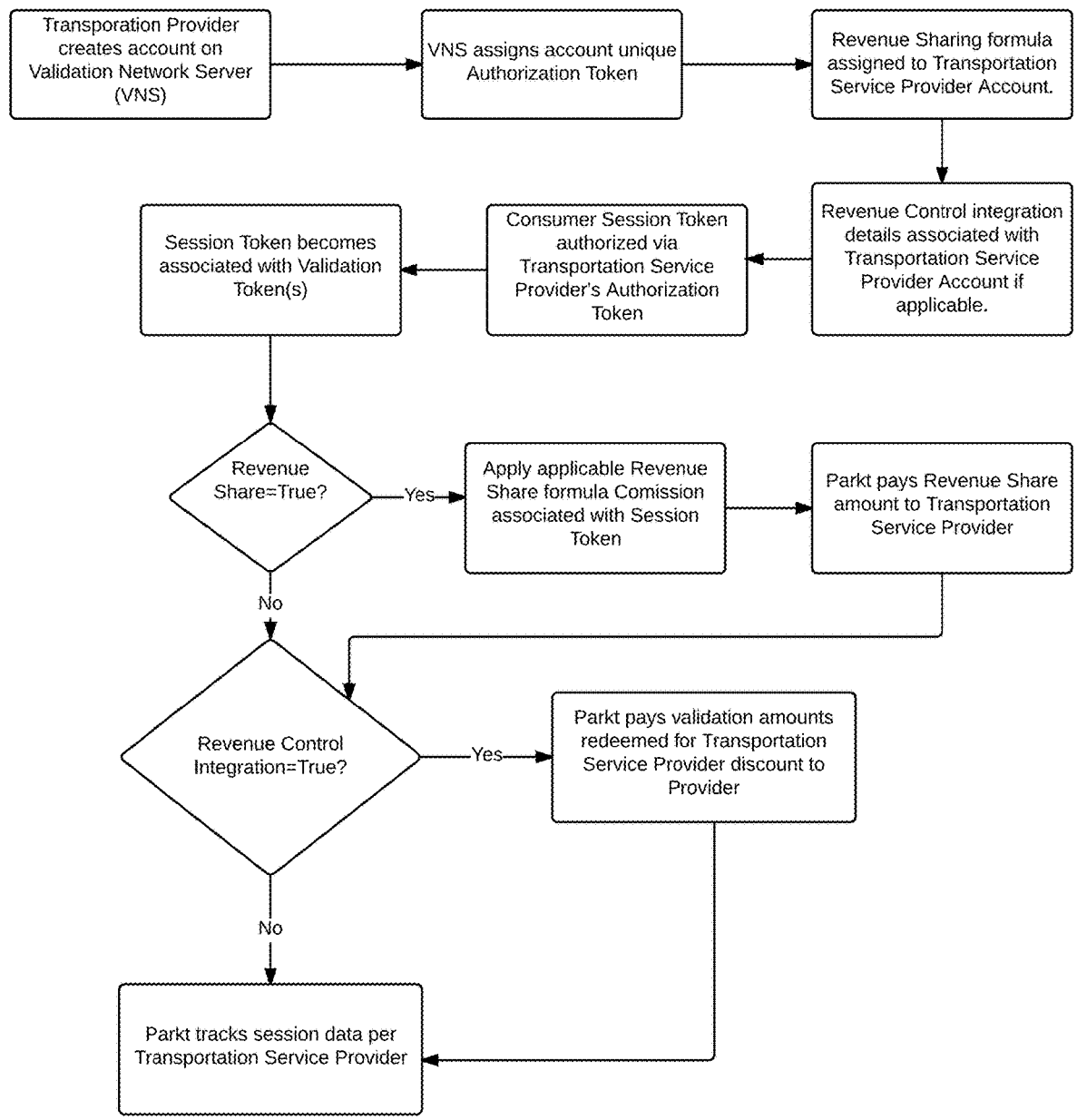
FIG. 19 shows a flowchart view that illustrates an embodiment of present invention showing how transportation providers can share revenue or integrate revenue control.
Figure 20:
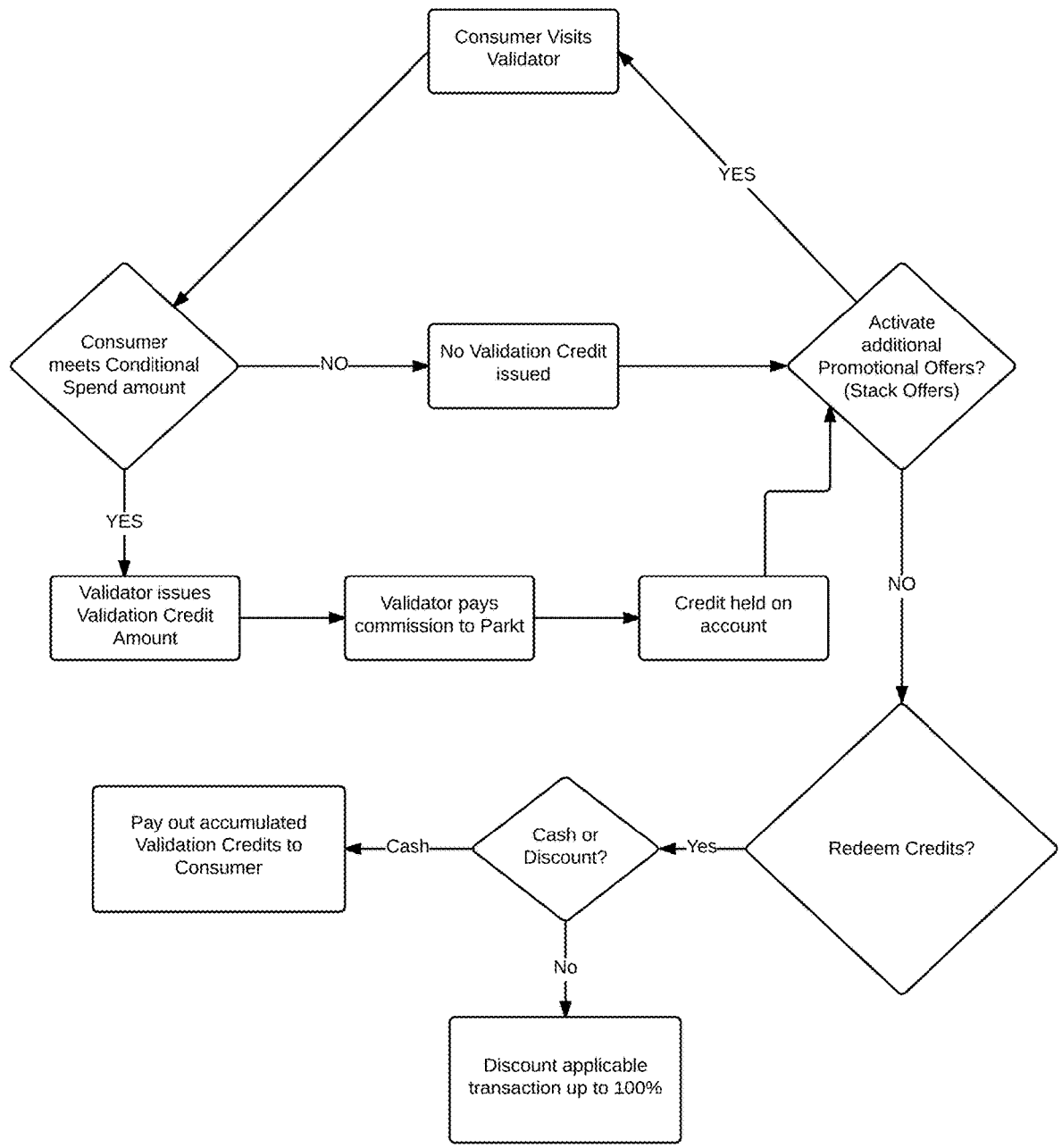
FIG. 20 shows a flowchart view that illustrates an embodiment of present invention showing how consumers can visit multiple merchants and receive multiple validations of promotional offers during a single travel session.
Figure 21:
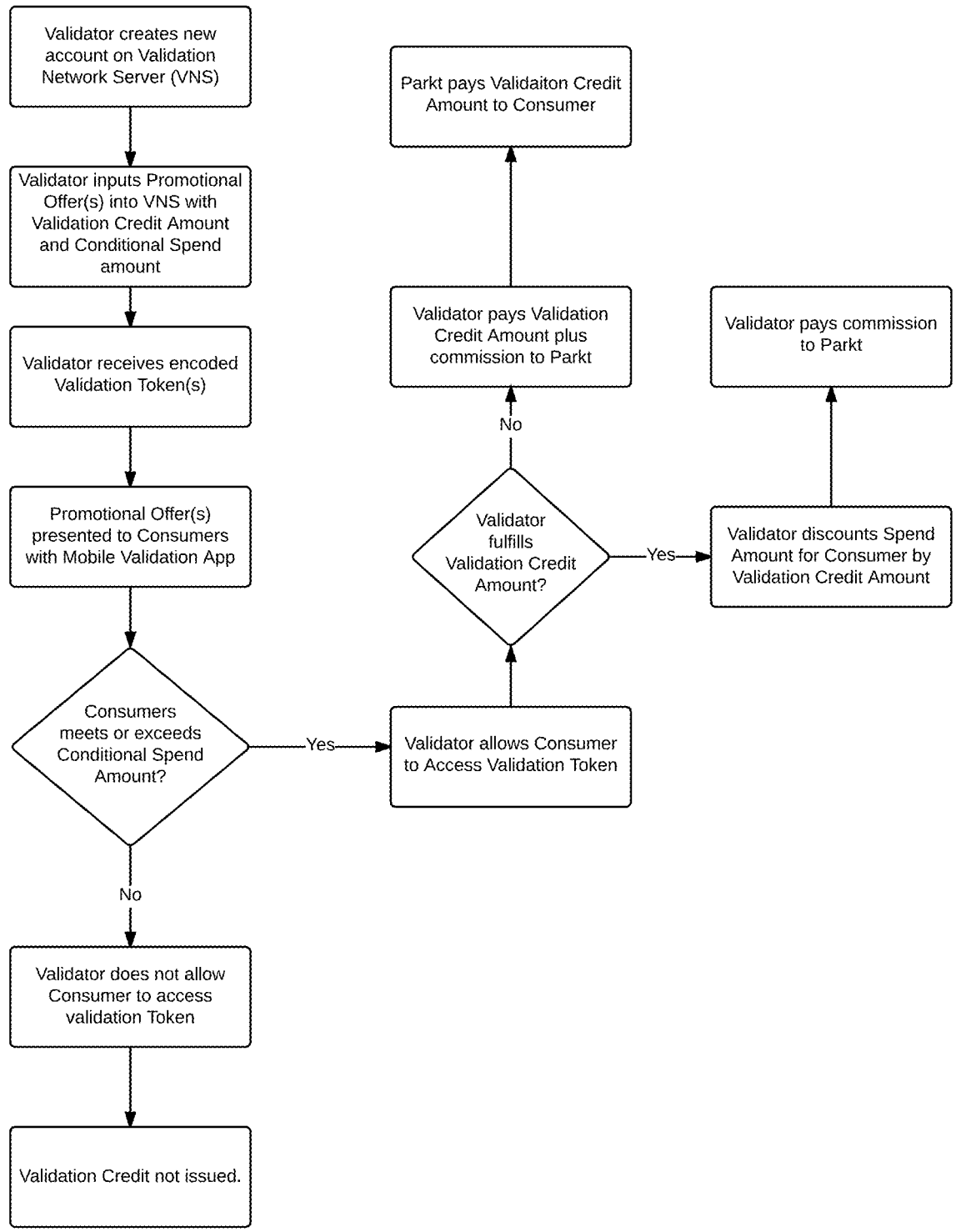
FIG. 21 shows a flowchart view that illustrates an embodiment of present invention that permits a merchant/validator to offer promotional validation offers, permit access to the validation token whenever a consumer meets the conditions of the offer, and pays commission plus credit to the validation network.

As discussed above and illustrated in FIGS. 13 and 17, linked payment methods and geolocation monitoring are both techniques that may be used to verify a customer's qualifying purchase at a merchant's physical location. These techniques may be combined in an embodiment that still uses a customer's mobile computing device to verify the customer's presence at a specific location, but eliminates the need to transmit tokens back and forth to merchants and customers where they are more vulnerable to misuse. Instead, tokens may remain on a server that is controlled by the validation network provider. These combined techniques also enable the validation network provider to continuously monitor the customer's purchases and automatically update the customer's user account with credits or other rewards whenever the customer makes a qualifying purchase at a participating merchant's physical location.

A token may be implemented with a data set containing data points relating to the customer's transaction and location history. The token may be updated using information gathered from various sources including linked payment data from transaction data sources and location data from the customer's mobile computing device. When the data points of a token fulfill the conditions of a promotional offer, the customer's user account may be automatically updated with points, credits or other rewards associated with the offer.

To begin using the system, the customer links one or more payment methods to the customer's user account during an onboarding process as described below with respect to FIG. 23. During the onboarding process, the customer also authorizes the validation network provider to collect geolocation data from the customer's mobile device. Payment methods that may be linked include credit cards, debit cards, checking accounts, etc., and enable the validation network provider to receive transaction information from the banks or other financial institutions associated with these linked payment methods. The geolocation data may be collected through a web app, mobile app or other feature that provides location services on the customer's mobile device.

Although the validation network provider may receive transaction information from a variety of different sources, transaction data aggregators such as Plaid and Yodlee typically provide the broadest coverage of banks and other financial institutions, thereby increasing likelihood of detecting every qualifying purchase. Unfortunately, transaction data from aggregators is frequently sparse and cryptic making it difficult to confirm that any specific purchase occurred at a specific physical location. However, by correlating this transaction data with location data from the customer's mobile computing device, the inventive principles of this patent disclosure enable a validation network provider to identify a customer's qualifying purchases with a high level of confidence.

Figure 22:
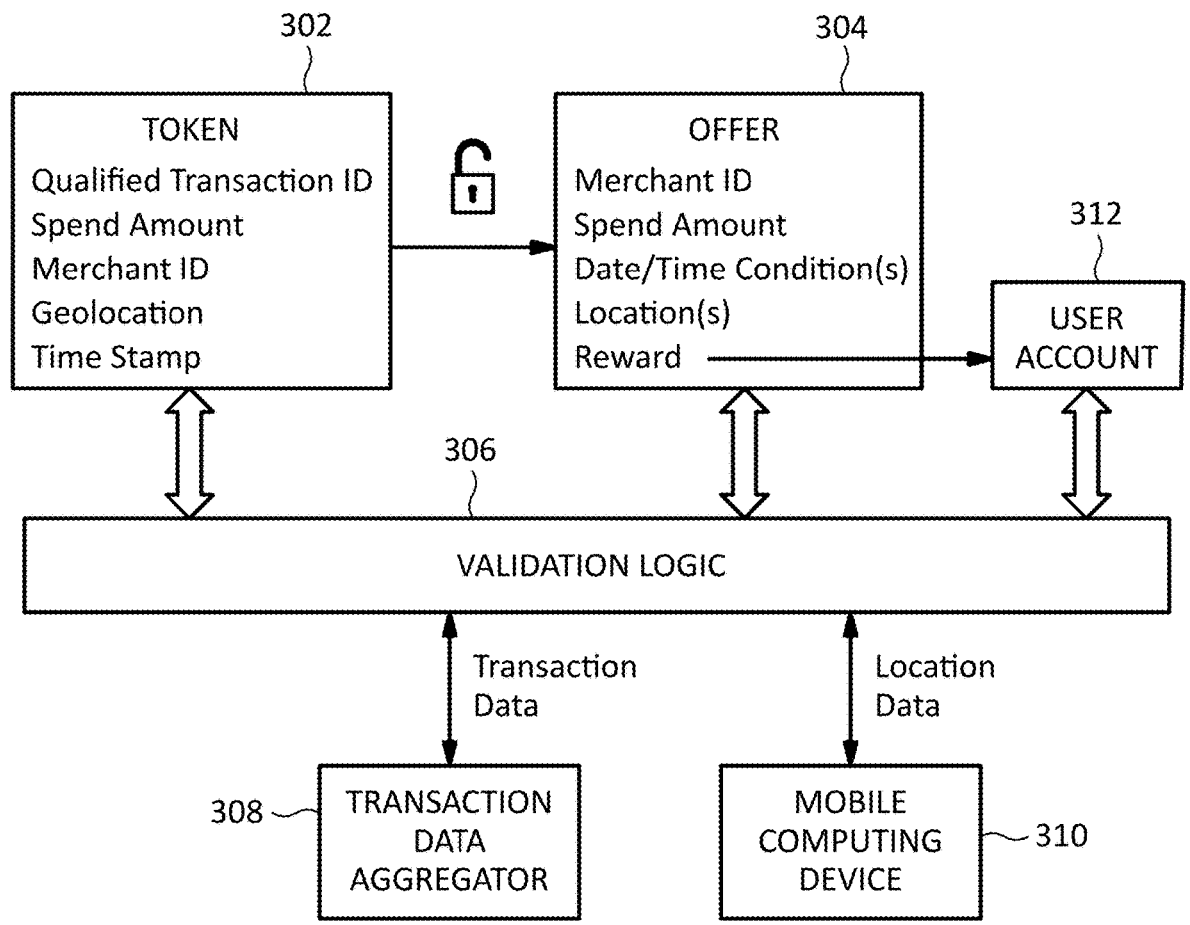
FIG. 22 illustrates an example embodiment of a process and logical structure in which linked payment methods and geolocation data are used to update a token according to the inventive principles of this patent disclosure.

FIG. 22 illustrates an example embodiment of a process and logical structure in which linked payment methods and geolocation data are used to update a token that remains on a server controlled by the validation network provider according to the inventive principles of this patent disclosure.

The token 302 may include any number of elements which, in this example, include data points related to a qualified transaction that is required to unlock a reward in an associated offer 304. The data points include a qualified transaction ID, a spend amount, a merchant ID, a geolocation, and a time stamp.

The terms of the offer 304 may include any number of conditions which, in this example, include a merchant ID, a spend amount, one or more date/time conditions, and one or more store locations or regions. The terms of the offer also include a reward which may include a fixed amount of credit for reaching a spend threshold or any other suitable reward.

The process of FIG. 22 is driven by validation logic 306 that may be implemented, for example, as part of the validate conditions function 120 illustrated in FIG. 1. The validation logic 306 manages an inventory of offers 304 for merchants or other sponsors, and a collection of tokens 302 in various stages of synthesis for specific users. At first, a token may be essentially empty, but as information from various sources (such as transaction data from transaction data aggregator 308 and location data from mobile computing device 310) is compiled and correlated by the validation network provider, the token 302 may be updated with data points that are added until the logic can recognize a qualifying transaction that fulfills the conditions of the offer 304.

The offer 304 is then unlocked, and the customer's user account 312 is credited with the reward.

In some embodiments, the validation logic may use a regex engine to parse data element strings in transaction records from a transaction data aggregator. In one example, a transaction record from a payment method linked to a specific customer's user account may provide enough information to identify a date and an amount of a purchase, but not enough information to fully identify the merchant name or location. However, location data from the customer's mobile computing device may indicate that, on the transaction date, the customer visited the physical location of a participating merchant that correlates with the information from the transaction record, thereby confirming a purchase from that merchant. If the purchase amount satisfies the spend condition of the offer, the validation logic may then assign a qualifying transaction ID to the token and use it to unlock the offer and credit the customer's user account with the reward. The validation logic may also use the correlated data to derive a merchant ID.

In another example, a transaction may provide enough information to identify a date, an amount of purchase, and the identity of a merchant that has multiple physical locations (a multi-store merchant), but not the specific location of the transaction. Location data from the customer's mobile computing device may indicate the location at which the transaction occurred. This information may be necessary, for example, if the multi-store merchant is trying to promote sales at a specific location, and the offer is only valid at that location. The same principles also apply to merchants that have both online and physical stores. If a promotional offer only applies to physical locations and the transaction data only identifies the merchant but not the specific store, the system may correlate the transaction data with geolocation data to recognize whether the specific transaction qualifies for the offer.

Depending on the embodiment, there may or may not be a 1:1 correlation between the elements of a composite token and the terms of the offer. For example, multiple elements of the token may be used to verify one condition of the offer. Moreover, some elements of the token may be derived from other elements of the token, possibly in combination with other sources of information.

An advantage of the embodiment of FIG. 22 is that it still uses a customer's mobile computing device to verify travel to a merchant's physical location, but it does not require any tokens to be transmitted to either the merchant or the customer where they may be more vulnerable to tampering, copying or other misuse or fraud. It may also reduce fraud or errors at the point of sale because the merchant cannot accidentally or purposely validate a token incorrectly.

The embodiment of FIG. 22 may also reduce friction with both the merchant and the customer because the automatic validation process does not require either party to take a specific action with a token while the customer is present at the physical location. Moreover, it eliminates the need for the merchant to acquire and train personnel to use dedicated apparatus for interacting with tokens.

An additional advantage is that transaction data aggregators pull transaction data directly from the customer's banks and other financial institutions that issue credit cards and debit cards. Therefore, transaction data aggregators (and therefore validation network providers) only need to obtain the customer's authorization to access the customer's transaction data. Payment network operators, payment processors, and other entities in the flow of transaction data are not able to block a validation network provider's access to this information.

As mentioned above, an advantage of the inventive principles relating to geolocation is that they enable a validation system to distinguish between different physical locations and/or online stores of a multi-store merchant. The inventive principles also apply to multi-merchant locations such as shopping malls, business districts, or food cart pods where multiple merchants in a geographic area may participate in unified promotional offers.

As one example, a shopping mall operator may create an offer to reimburse a shopper for travel to the mall if the shopper spends more than a threshold amount at the mall. The offer may require the amount to be spent at a single merchant, or it may allow the shopper to combine purchases at different merchants to meet the threshold. Alternatively, the offer may be structured in tiers where there is a lower threshold for a single merchant purchase and a higher threshold for combined purchases.

The system may establish a geofence around the mall, and the customer's travel to the mall is verified if the location data from the customer's mobile device confirms its presence at any location within the geofence. Depending on the offer structure, a qualifying purchase may be confirmed if the location data from the customer's mobile device correlates with transaction data from any merchant or combination of merchants located within the geofence.

This type of arrangement may allow the mall operator to handle the administration of a rewards program on behalf of the merchants, thereby freeing them of the need to invest in individual programs and training, and also freeing customers from the need to take specific actions other than making purchases at the merchants. The mall operator may charge the reward costs to the individual merchant or merchants at which the customer made a threshold spend, or the reward costs may be spread over any or all of the mall merchants, possibly in the form of increased rent.

Figure 23:
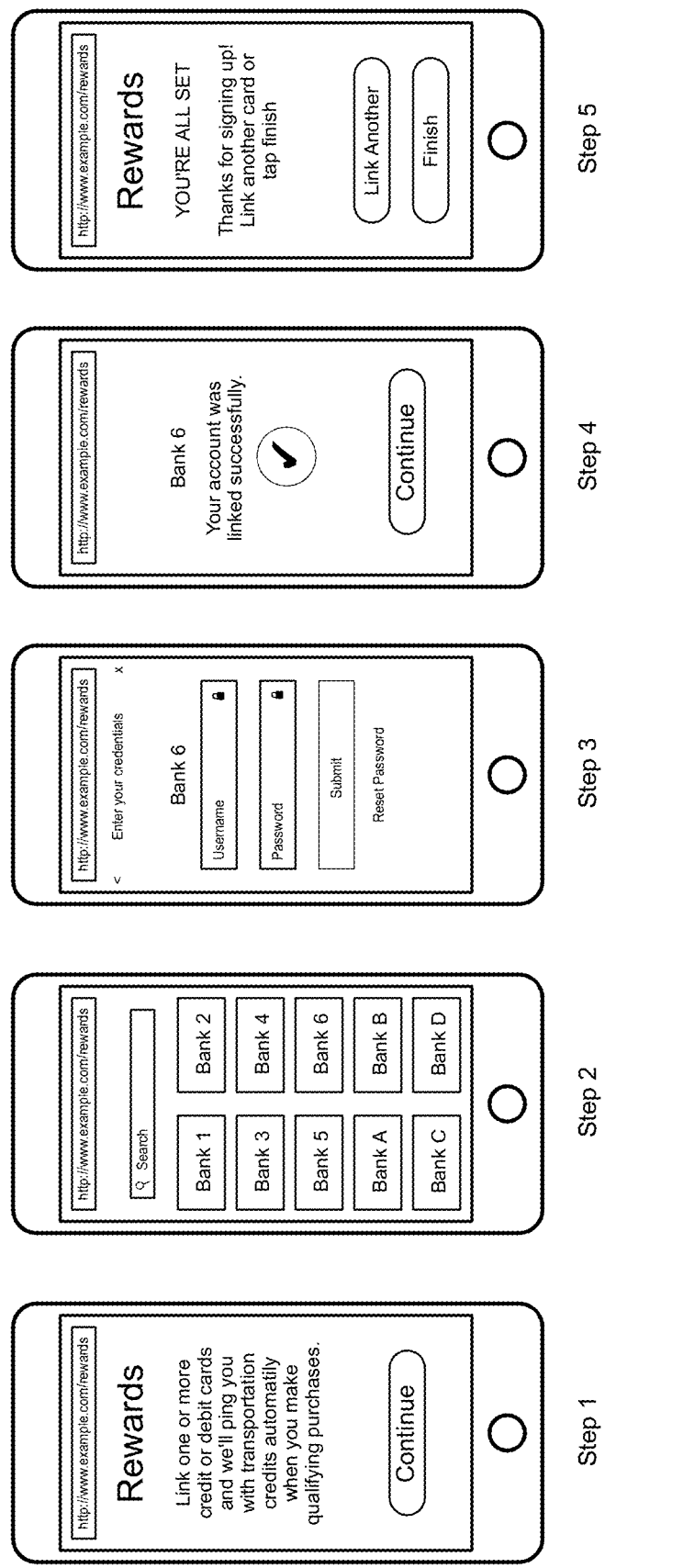
FIG. 23 illustrates an example embodiment of a process for linking a customer's payment methods to a user account during an onboarding process according to the inventive principles of this patent disclosure.

FIG. 23 illustrates an example embodiment of a process for linking a customer's payment methods to a user account during an onboarding process according to the inventive principles of this patent disclosure. The screen on the mobile computing device in FIG. 23 is displaying the window of a browser that is connected to the validation network provider's rewards page. The customer may have arrived at this page illustrated at Step 1 by clicking a link in a text message or advertisement at another website, by entering the URL from print and signage, by scanning a QR code, etc. Alternatively, a similar linking process may be implemented in a mobile app which may display a similar sequence of screens.

At Step 1 the customer is provided with an explanation of the reason for linking payment methods and then prompted to continue. At Step 2, the customer may search for and select a bank by clicking on a button for the bank. At Step 3, the customer is prompted to enter their credentials for the selected bank. At Step 4, the customer is advised that account for the selected bank was linked successfully and prompted to continue. At Step 6 the customer is advised that the linking process has been successful and prompted to either link another payment method or finish the process. The customer may also be provided with a dedicated check box or with terms of service that authorize the validation network provider to collect location data from the customer's mobile device.

Messaging to Prompt Geolocation Updates

In some situations, a validation network provider may have continuous access to geolocation data from a customer's mobile computing device, for example, through a mobile app or other service that provides location updates while running continuously in the background. In other situations, geolocation data may only be made available periodically, for example, when a customer visits or refreshes a website operated by the validation network provider, which may include running a web app within that site.

Situations in which location data is only available periodically may result from consumer "app fatigue" which makes users reluctant to download additional apps to their mobile devices. Some consumers may also disable location services on their mobile devices out of privacy or other concerns. When location data is only available periodically, the validation network provider may use various techniques to prompt more frequent location updates from the customer's mobile device as a way to obtain more location data to correlate with financial transaction data.

One technique for prompting geolocation updates is to send text (SMS) messages, emails, push notifications, or other messages to the customer's mobile device at various times. These messages may include links or other features that, when acted upon by the customer, cause updated geolocation data to be transmitted to the validation network provider. For example, a link may take the customer to the validation network provider's website using a browser on the customer's mobile device which triggers a location update. These website based location updates may be authorized by the customer during the onboarding process (e.g., through a dedicated check box or in the terms of use) or at other times during the customer lifecycle.

There are a variety of different times that a validation network provider may send a customer a message that prompts a geolocation update. For example, messages may be sent periodically or when a certain amount of time has elapsed since the last update. Another example is to send a message when the validation network provider has received transaction data that indicates a very recent and potentially qualifying purchase but does not provide adequate location information.

A validation network provider may also take advantage of existing user interaction points in the normal user experience to send a message that prompts a geolocation update. For example, a customer's user account may be credited with a reward from a qualifying purchase anywhere from a few minutes to a few days after the purchase, depending on the source of transaction data. The time at which the credit is posted is an opportunity to send a message that informs the customer of the new credit and prompts the customer to click on a link to view and/or redeem the credits, and at the same time triggers a geolocation update. This type messaging scheme serves the dual purpose of customer outreach while also piggybacking a prompt for a geolocation update.

Another example of a user interaction point that may be used to prompt a geolocation update is when onboarding a new customer. This is because onboarding is very likely to occur at a merchant's physical location when the customer is making a purchase, so the geolocation data is likely to have a very strong correlation with the resulting transaction data.

In some embodiments, an SMS chatbot may serve as an ideal platform for messaging to prompt geolocation updates because it may also serve as a primary platform for other client interactions such as onboarding new users, checking account balances, redeeming credits, etc.

Additional Transaction Data Sources for Linked Payments

Although some of the embodiments described above use transaction data aggregators as sources of transaction information for linked payment methods, other data sources may be used in accordance with the inventive principles of this patent disclosure. The inventive principles contemplate a system in which the validation network provider gathers transaction data, geolocation data and any other useful information from as many sources as possible and then selects and correlates the best available information to synthesize a token that provides the most accurate evaluation possible for a specific transaction.

One additional source of transaction data is card-linked services. These are typically provided by tradition payment network operators such as Visa and MasterCard which provide well-defined APIs and relatively open access to their networks. The data from card-linked services tends to be available more quickly, even in real-time, but is limited to transactions that run through the operator's network. Thus it may augment data from other sources by providing some transaction information that is more timely, but may still provide an incomplete picture of a specific customer's overall purchases.

Another additional source of transaction data is payment processors such as Verifone and Ingenico. These sources may provide comprehensive transaction data across most linked payment methods in real-time. However, these sources have only recently started to provide APIs and platforms for third-party apps, and it may be difficult to obtain the processor's approval to link to their services.

The promotional offers and rewards typically operate outside of the conventional merchant loyalty programs and cash-back and rewards systems operated by banks and other financial institutions. In other words, when a customer receives a transportation credit or other reward for a purchase through the validation network provider, the customer may receive this reward in addition to any loyalty points that may be offered through the merchant's loyalty program or cash-back or credits that may be offered through a bank that issues a credit card.

Additional Sponsors and Reward Programs

The inventive principles of this patent disclosure may also be applied to additional sponsors and reward program. For example, an apartment landlord or employer may want to provide tenants or employees with monthly transportation credits to encourage use of public transportation, taxis, ride shares and other modes of transportation, and to reduce demand for vehicle parking at the apartment building or the employer's business. In these use cases, there would be no need to verify a qualifying purchase, but there may be other validation conditions that could be verified through the use of the logical structure and processes of offers and tokens as described above with respect to FIG. 22.

For example, rather than a spend amount and store location, the terms of the offer 304 may include tenancy or employment verification conditions. Likewise, the qualified transaction ID, a spend amount, a merchant ID, a geolocation elements of the token 302 may be replaced with a user ID or other data point that confirms that the user is a tenant or employee and the intended recipient of the transportation credit.

These examples could also be implemented by validation logic 306 as part of the validate conditions function 120 illustrated in FIG. 1.

Although Applicant has described Applicant's preferred embodiments of this invention, it will be understood that the broadest scope of this invention includes modifications and implementations apparent to those skilled in the art after reading the above specification and the below claims. Such scope is limited only by the below claims as read in connection with the above specification. Further, many other advantages of Applicant's invention will be apparent to those skilled in the art from the above descriptions and the below claims. Moreover, the various details embodiments described above may be combined to produce additional embodiments according to the inventive principles of this patent disclosure. Since the inventive principles of this patent disclosure can be modified in arrangement and detail without departing from the inventive concepts, such changes and modifications are considered to fall within the scope of the following claims.

The invention claimed is:

1. A method for verification of travel and a purchase to prevent fraudulent redemption of a promotional offer for conditional transportation cost validation, the method comprising the steps of:

verifying a customer's travel to a merchant's physical location through a validation network provider across a computer network using the customer's mobile computing device to transmit geolocation data to the validation network provider while present at the merchant's physical location;

updating a token on the validation network provider's server using the geolocation data from the customer's mobile computing device, thereby confirming the customer's presence at the merchant's physical location;

confirming the purchase by correlating transaction data from a linked payment method with the geolocation data from the customer's mobile device to update the token on the validation network provider's server; and automatically issuing a credit to the customer when the data points of the token fulfill the conditions of the promotional offer;

wherein the promotional offer is to reimburse the customer for travel expenses the customer incurs for traveling to or from the merchant's physical location.

2. The method of claim 1 wherein:

the merchant is one of multiple merchants located within a geofence;

the promotional offer also applies to one or more of the other merchants located within the geofence;

the customer's travel to a merchant's physical location is verified if the customer's mobile device confirms its presence at any location within the geofence; and the customer's qualifying purchase is confirmed if the location data from the customer's mobile device correlates with transaction data from any of the other merchants located within the geofence.

3. The method of claim 1 further comprising deriving a merchant ID for the qualifying purchase by correlating the transaction data with location data from the customer's mobile device.

4. The method of claim 1 wherein:

the promotional offer is for a reward program having a sponsor; and the conditions of the promotional offer include confirmation that the customer is affiliated with the sponsor.

5. The method of claim 4 wherein:
the sponsor comprises an employer; and
the credit recipient comprises an employee of the employer.

6. The method of claim 4 wherein:
the sponsor comprises a landlord; and
the credit recipient comprises a tenant of the landlord.

7. A method to prevent fraudulent redemption of an offer for transportation credits through a reward program having a sponsor, the method comprising the steps of:
verifying a credit recipient's travel, via a mode of transportation, through a validation network provider across a computer network using the credit recipient's mobile computing device to transmit one or more data points to the validation network provider while using the mode of transportation;
updating a token on the validation network provider's server using the one or more data points from the credit recipient's mobile computing device, thereby verifying the credit recipient's use of the mode of transportation;
verifying a condition of the offer by updating the token on the validation network provider's server using a data point that confirms that the user of the mode of travel is the intended recipient of the transportation credit; and
automatically issuing a transportation credit to the credit recipient when the data points of the token fulfill the conditions of the offer;
wherein the sponsor of the reward program determines the mode of transportation as a term of the offer for transportation credits through the reward program.

8. The method of claim 7 wherein:
the sponsor comprises an employer; and
the credit recipient comprises an employee of the employer.

9. The method of claim 7 wherein:
the sponsor comprises a landlord; and
the credit recipient comprises a tenant of the landlord.

10. The method of claim 7 wherein the data point that confirms that the user of the mode of travel is the intended recipient of the transportation credit comprises a user ID.

11. The method of claim 7 wherein the mode of transportation comprises one or more of public transportation, taxis, and ride shares.

12. The method of claim 7 further comprising managing a synthesized token for a credit recipient with validation logic on the validation network provider's server, wherein the token comprises a data structure that is initially essentially empty, and the token is synthesized by adding the data points until the validation logic can recognize that the conditions of the offer are fulfilled.

13. The method of claim 12 wherein:
the sponsor comprises an employer; and
the credit recipient comprises an employee of the employer.

14. The method of claim 12 wherein:
the sponsor comprises a landlord; and
the credit recipient comprises a tenant of the landlord.

15. The method of claim 12 wherein the data point that confirms that the user of the mode of travel is the intended recipient of the transportation credit comprises a user ID.

16. The method of claim 12 wherein the mode of transportation comprises one or more of public transportation, taxis, and ride shares.

\* \* \* \* \*